(12) United States Patent
Jeon et al.

(10) Patent No.: US 10,928,073 B2
(45) Date of Patent: Feb. 23, 2021

(54) COOKING APPARATUS

(71) Applicant: SAMSUNG ELECTRONICS CO., LTD., Suwon-si (KR)

(72) Inventors: In Ki Jeon, Hwaseong-si (KR); Tae Hun Kim, Seoul (KR); Hyeong Jin Jang, Namwon-si (KR); Min Gyu Jung, Seongnam-si (KR); Sang Jin Jeong, Yongin-si (KR); Yeo Wool Jung, Suwon-si (KR); Kun Woo Choi, Icheon-si (KR); Yu Jeub Ha, Hwaseong-si (KR); Dong Gi Han, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 166 days.

(21) Appl. No.: 15/506,110

(22) PCT Filed: May 8, 2015

(86) PCT No.: PCT/KR2015/004609
§ 371 (c)(1),
(2) Date: Feb. 23, 2017

(87) PCT Pub. No.: WO2016/035971
PCT Pub. Date: Mar. 10, 2016

(65) Prior Publication Data
US 2018/0220498 A1    Aug. 2, 2018

(30) Foreign Application Priority Data

Sep. 2, 2014    (KR) .................. 10-2014-0116255

(51) Int. Cl.
*F24C 15/32*    (2006.01)
*A21B 1/26*    (2006.01)
(Continued)

(52) U.S. Cl.
CPC ............... *F24C 15/32* (2013.01); *A21B 1/26* (2013.01); *F24C 15/16* (2013.01); *F24C 15/325* (2013.01); *H05B 6/6473* (2013.01)

(58) Field of Classification Search
CPC ..................................................... F24C 15/322
See application file for complete search history.

(56) References Cited

U.S. PATENT DOCUMENTS

| 3,384,068 A | 5/1968 | Perry et al. |
| 4,154,861 A | 5/1979 | Smith |

(Continued)

FOREIGN PATENT DOCUMENTS

| CN | 1297127 | 5/2001 |
| CN | 1752550 | 3/2006 |

(Continued)

OTHER PUBLICATIONS

Australian Office Action dated Feb. 9, 2018, in corresponding Australian Patent Application No. 2015312794.
(Continued)

*Primary Examiner* — Avinash A Savani
*Assistant Examiner* — Deepak A Deean
(74) *Attorney, Agent, or Firm* — Staas & Halsey LLP

(57) ABSTRACT

In accordance with an embodiment of the present disclosure, a cooking apparatus includes a casing, a cooking chamber provided inside the casing and including a discharge plate at which a plurality of outlet holes are formed, a tray provided at a bottom surface of the cooking chamber to support food, and a hot air discharging unit configured to discharge high-temperature air into the cooking chamber through the outlet holes, wherein the plurality of outlet holes are formed at a first area facing the tray.

5 Claims, 22 Drawing Sheets

(51) Int. Cl.
*F24C 15/16* (2006.01)
*H05B 6/64* (2006.01)

(56) References Cited

U.S. PATENT DOCUMENTS

| | | | | |
|---|---|---|---|---|
| 5,693,242 | A * | 12/1997 | Sanchez | A21B 1/26 126/21 A |
| 5,798,505 | A * | 8/1998 | Lee | H05B 6/6476 126/21 A |
| 6,615,819 | B1 * | 9/2003 | Hernandez Burgos | F24C 15/322 126/21 A |
| 2005/0109760 | A1 * | 5/2005 | Tatsumu | F24C 15/325 219/399 |
| 2008/0105249 | A1 * | 5/2008 | McFadden | A21B 1/245 126/21 A |
| 2009/0013987 | A1 * | 1/2009 | Akdag | F24C 15/322 126/21 A |
| 2011/0126819 | A1 * | 6/2011 | Yoshimura | F24C 15/322 126/21 A |

FOREIGN PATENT DOCUMENTS

| | | |
|---|---|---|
| CN | 1922442 A | 2/2007 |
| CN | 101253368 | 8/2008 |
| CN | 101666512 | 3/2010 |
| JP | 9-273759 | 10/1997 |
| JP | 2003-254536 | 9/2003 |
| KR | 10-2006-0037664 | 5/2006 |
| KR | 10-0617635 | 8/2006 |
| KR | 10-2006-0108796 | 10/2006 |
| KR | 10-2011-0058140 | 6/2011 |

OTHER PUBLICATIONS

European Office Action dated Apr. 11, 2017, in corresponding European Patent Application No. 15837491.8.
Extended European Search Report dated Apr. 6, 2018, in corresponding European Patent Application No. 15837491.8.
Australian Office Action dated Aug. 8, 2018, in corresponding Australian Patent Application No. 2015312794.
Australian Office Action dated Oct. 10, 2018, in corresponding Australian Patent Application No. 2015312794.
Chinese Office Action dated Aug. 20, 2018, in corresponding Chinese Patent Application No. 201580058186.9.
International Search Report dated Jul. 30, 2015 in corresponding International Application No. PCT/KR2015/004609.
Australian Office Action dated May 28, 2018, in corresponding Australian Patent Application No. 2015312794.
Canadian Office Action dated Jan. 5, 2018, in corresponding Canadian Patent Application No. 2,957,890.
Canadian Office Action dated Dec. 6, 2018, in corresponding Canadian Patent Application No. 2,957,890.
Chinese Patent Office issued Second Office Action in Chinese Patent Application No. 201580058186.9 dated Feb. 22, 2019 (32 Total pages).
Japanese Office Action dated Mar. 26, 2019 in corresponding Japanese Patent Application No. 2017-508600.
Japanese Patent Office Action issued in corresponding Japanese Patent Application No. 2017-508600 dated Nov. 26, 2019.
Canadian Patent Office Action issued in corresponding Canadian Patent Application No. 2,957,890 dated Nov. 14, 2019.
Indian Patent Office Action issued in corresponding Indian Patent Application No. 201727005367 dated Sep. 30, 2019.
Korean Office Action dated Jun. 10, 2020, in corresponding Korean Patent Application No. 10-2014-0116255.
Chinese Office Action dated Jun. 3, 2020, in corresponding Chinese Patent Application No. 201910747780.9.
Decision of Refusal dated Aug. 19, 2020, in corresponding Japanese Patent Application No. 2017-508600.
Decision of Dismissal of Amendment dated Aug. 19, 2020, in corresponding Japanese Patent Application No. 2017-508600.
Canadian Office Action dated Aug. 21, 2020, in corresponding Canadian Patent Application No. 2,957,890.

* cited by examiner

[Fig. 1]
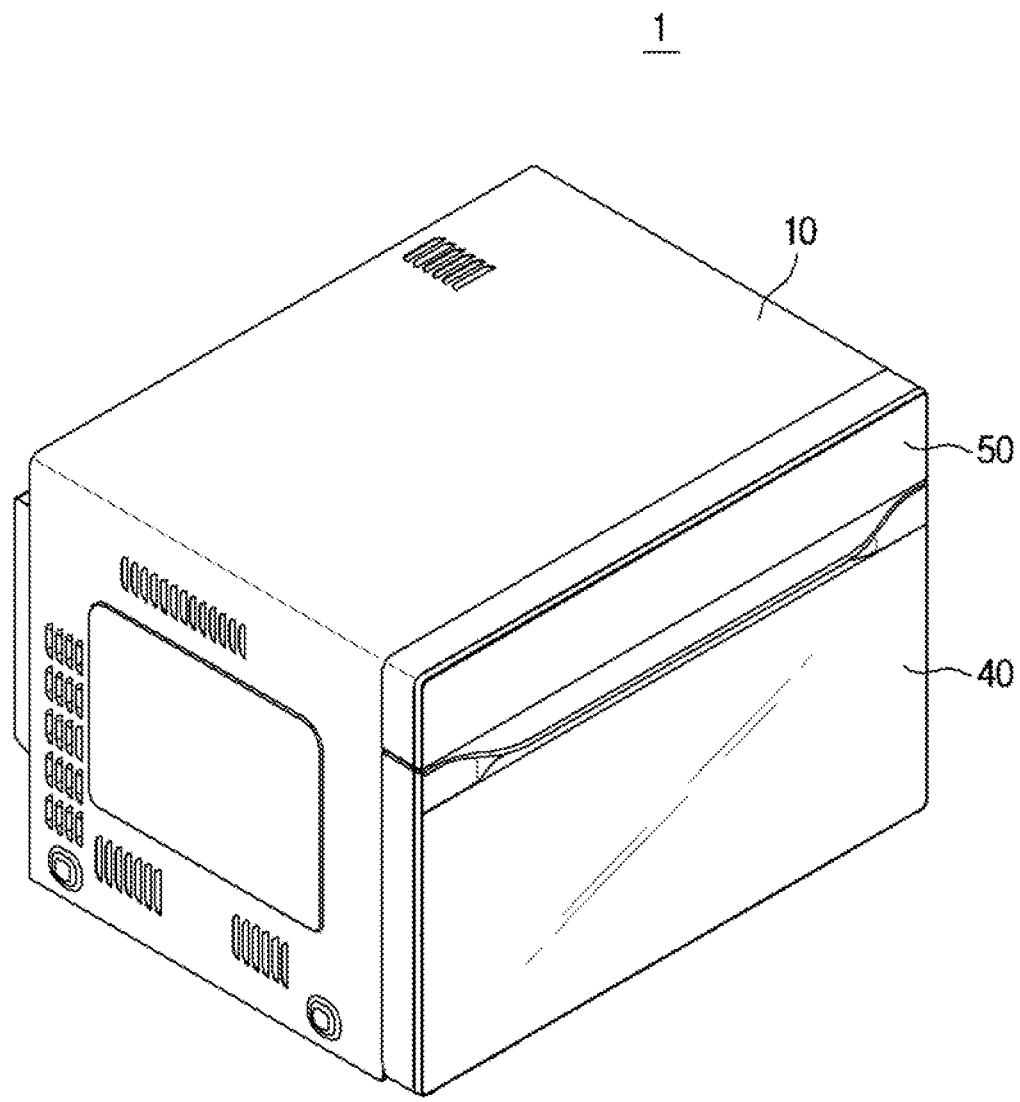

[Fig. 2]
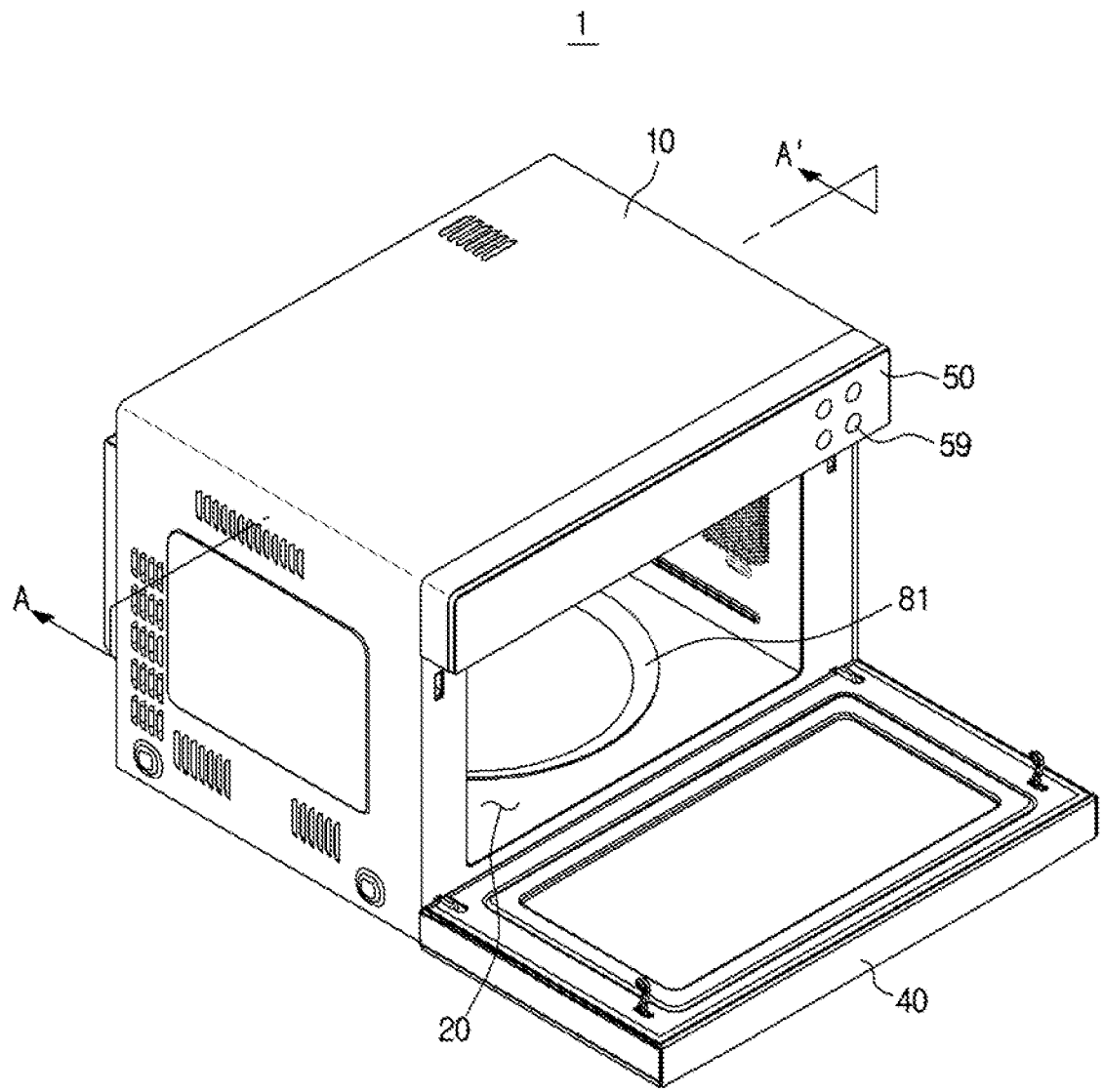

[Fig. 3]
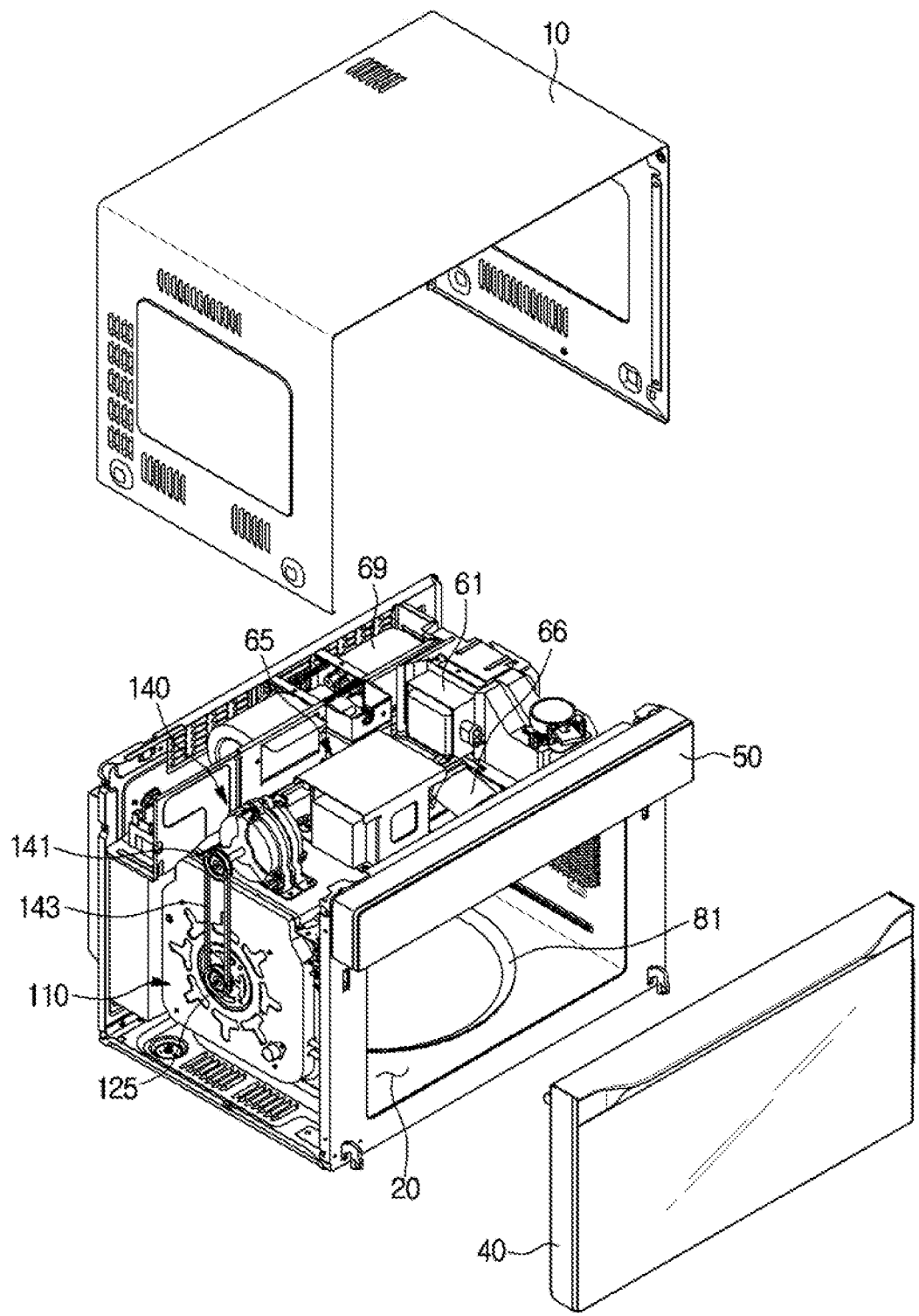

[Fig. 4]
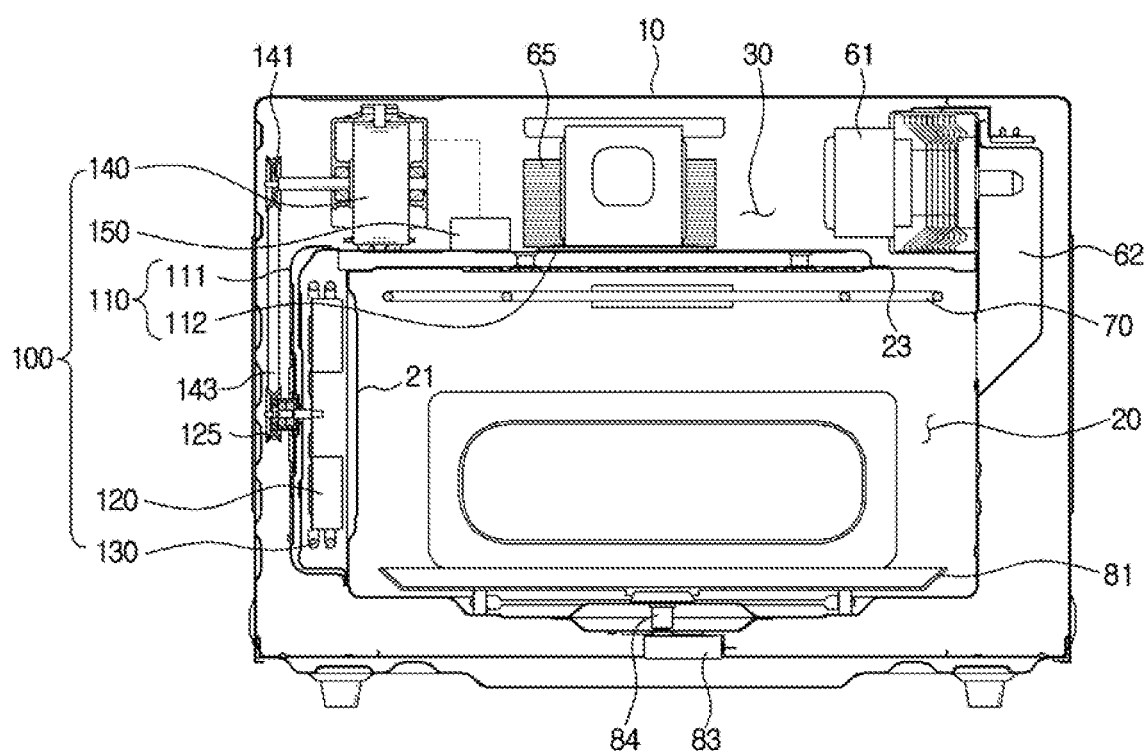

[Fig. 5]
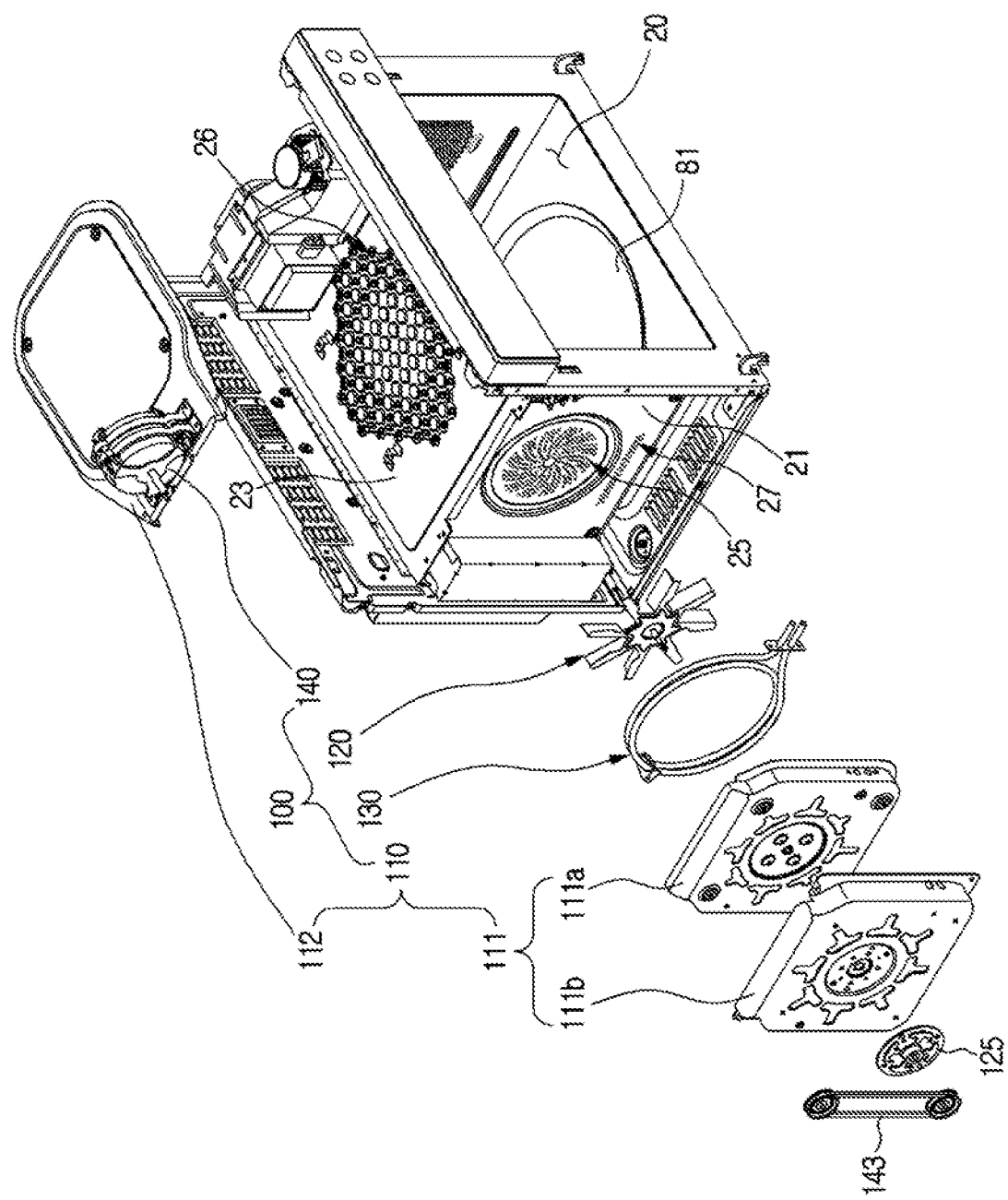

[Fig. 6]
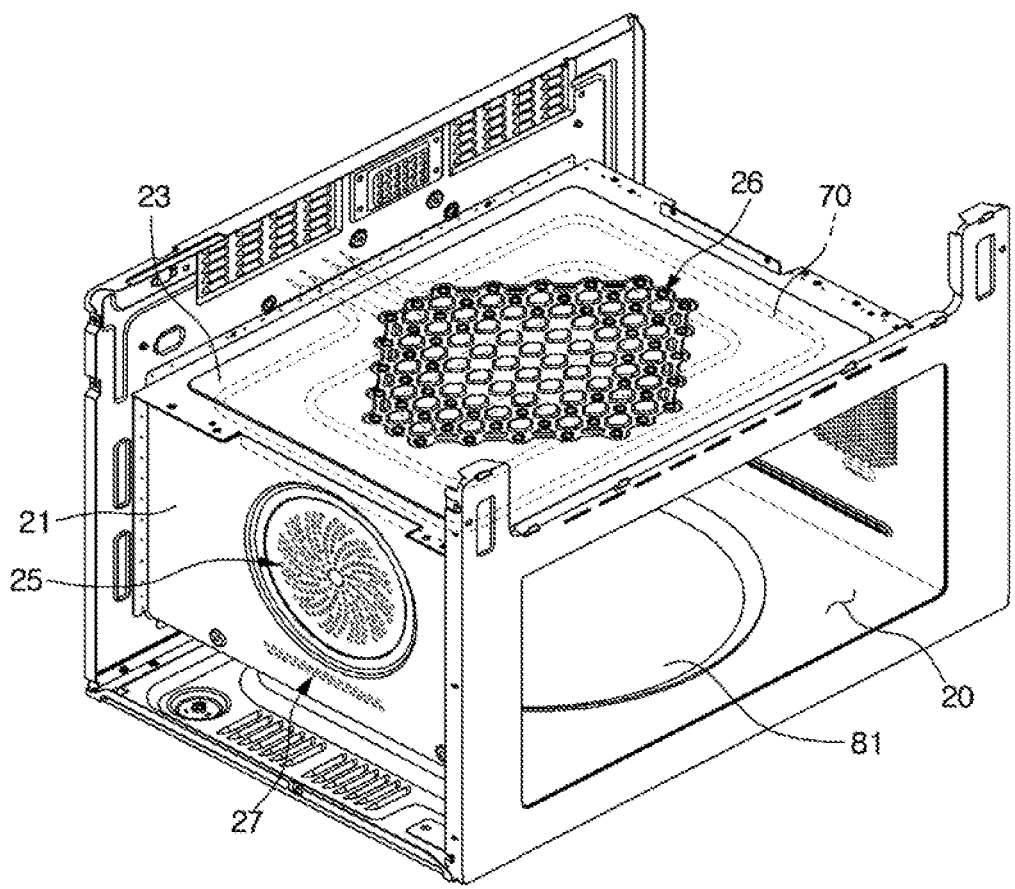

[Fig. 7]
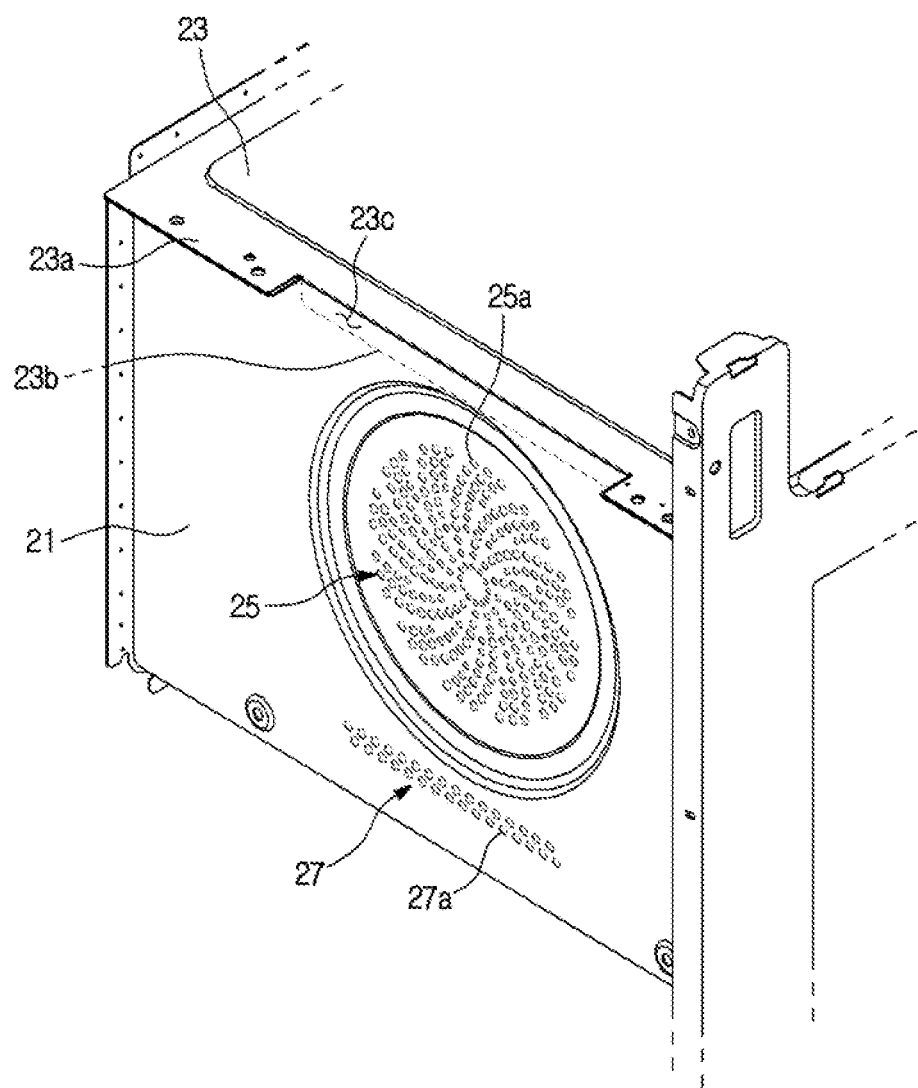

[Fig. 8]
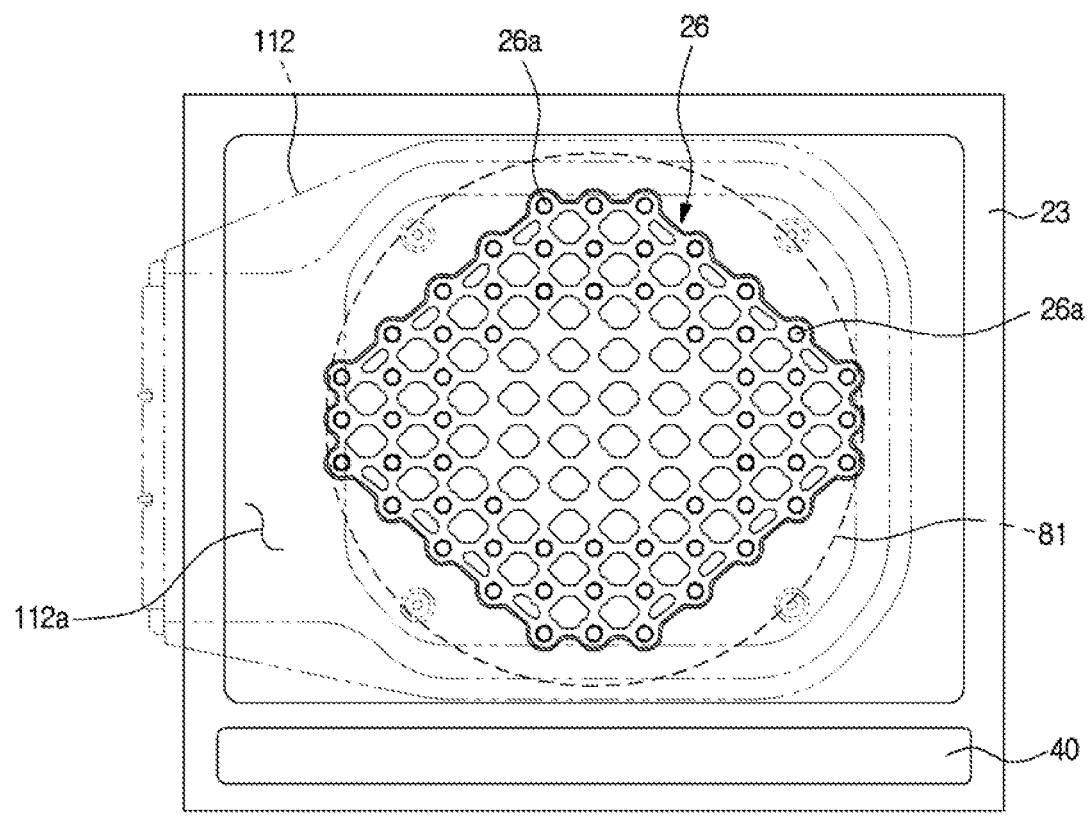

[Fig. 9]
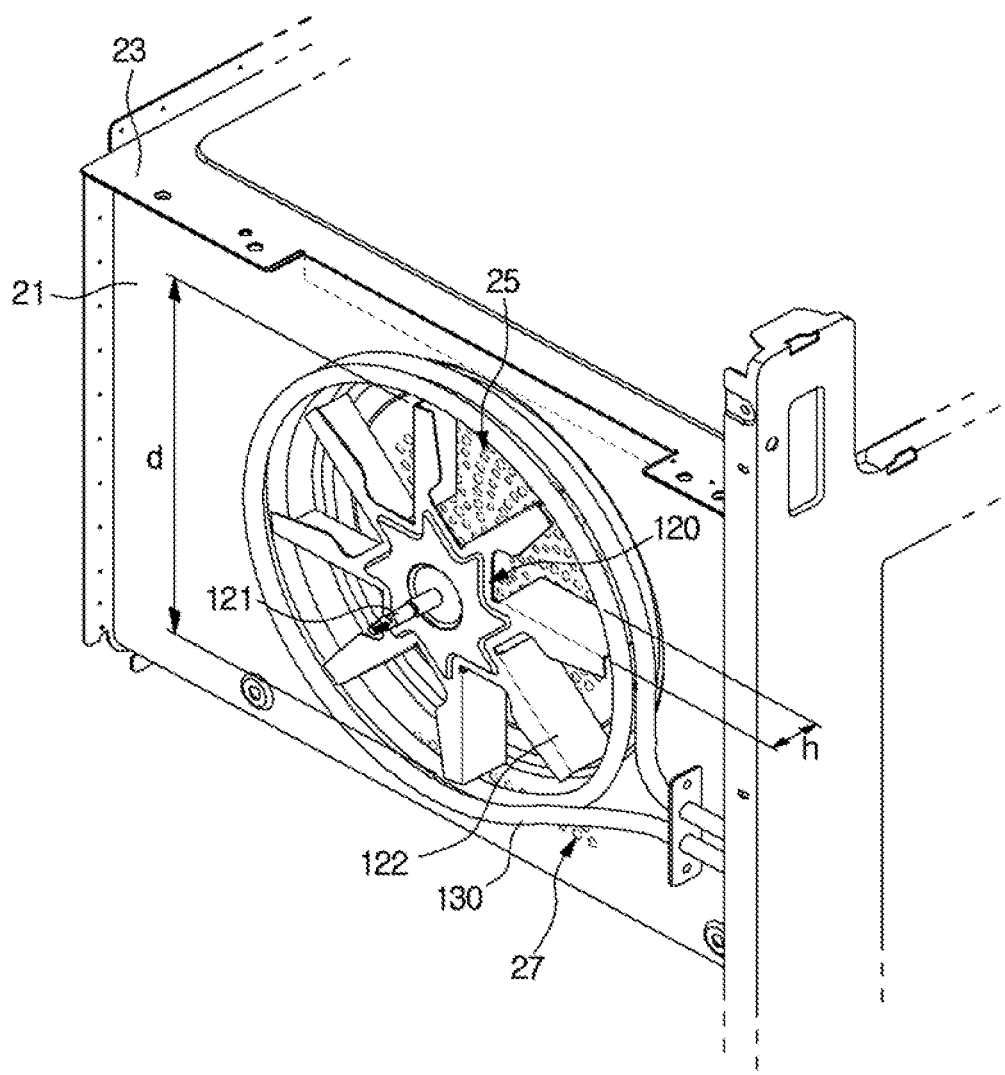

[Fig. 10]
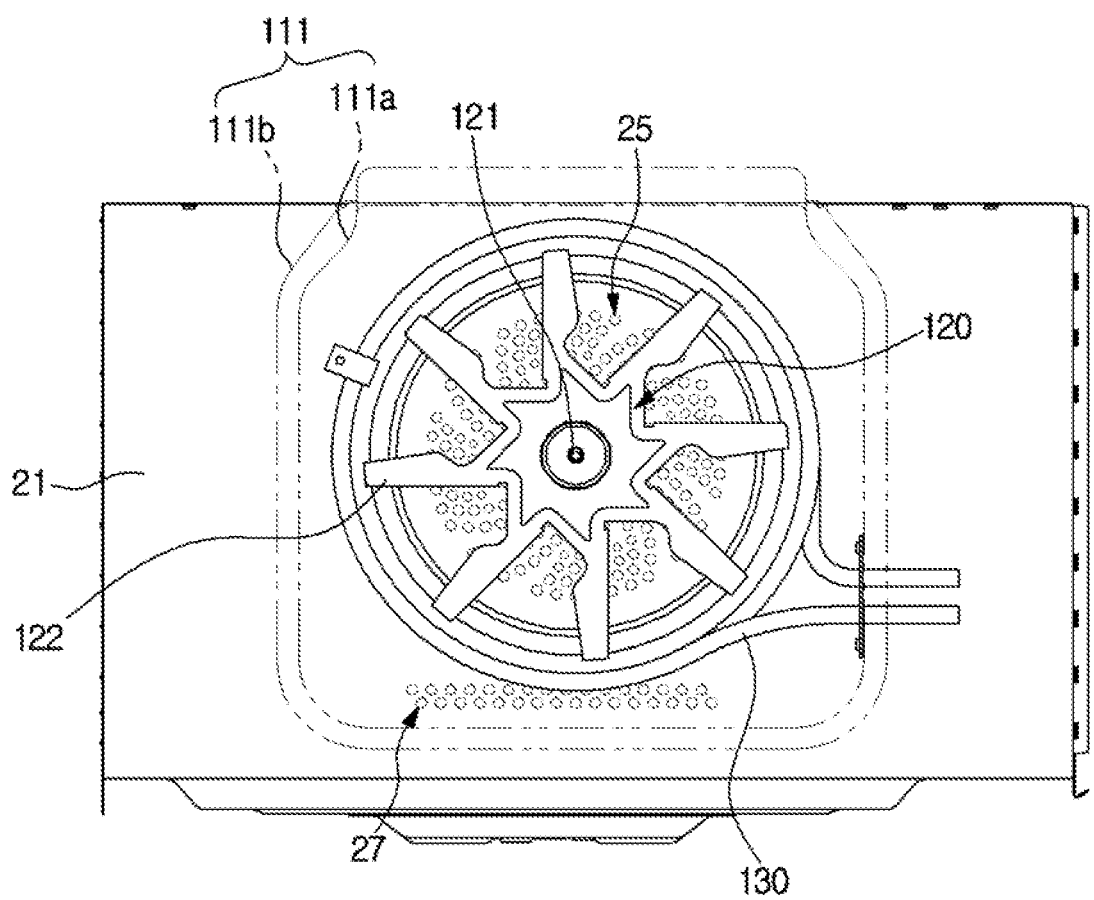

[Fig. 11]
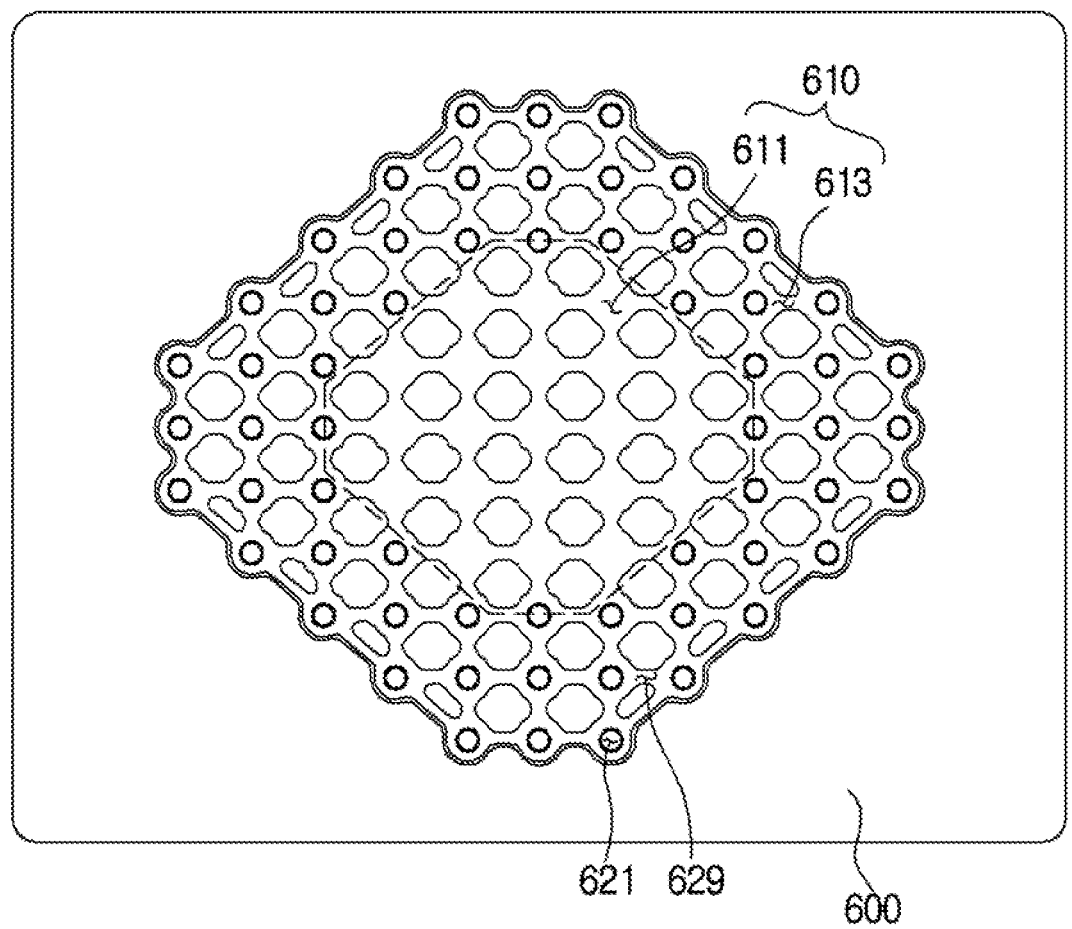

[Fig. 12]
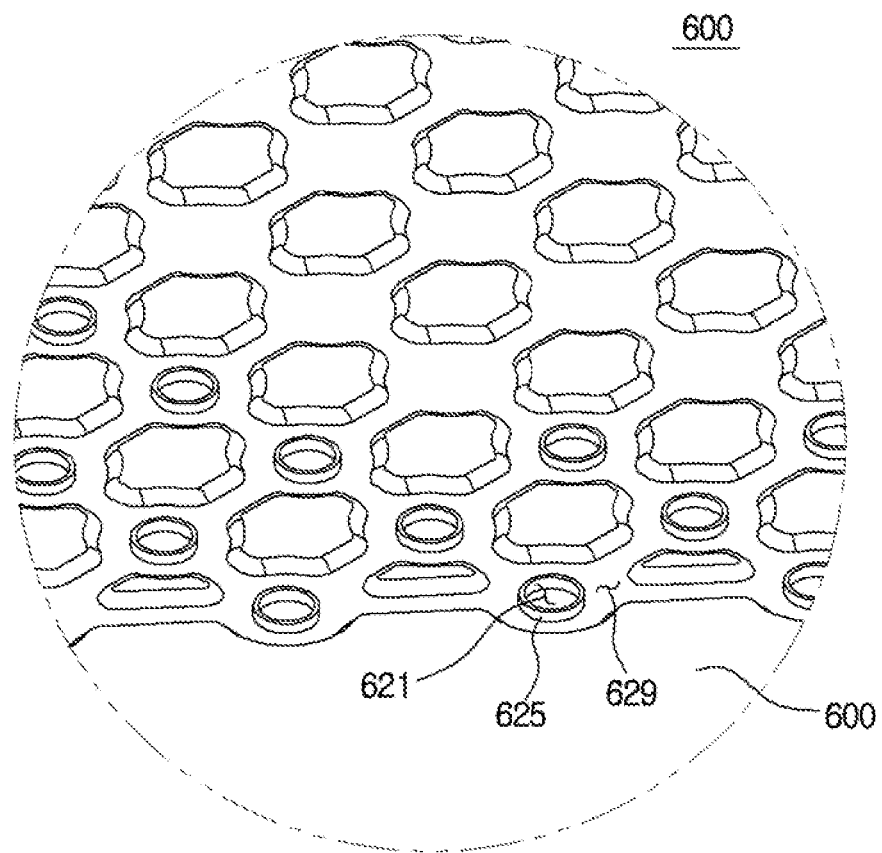
[Fig. 13]
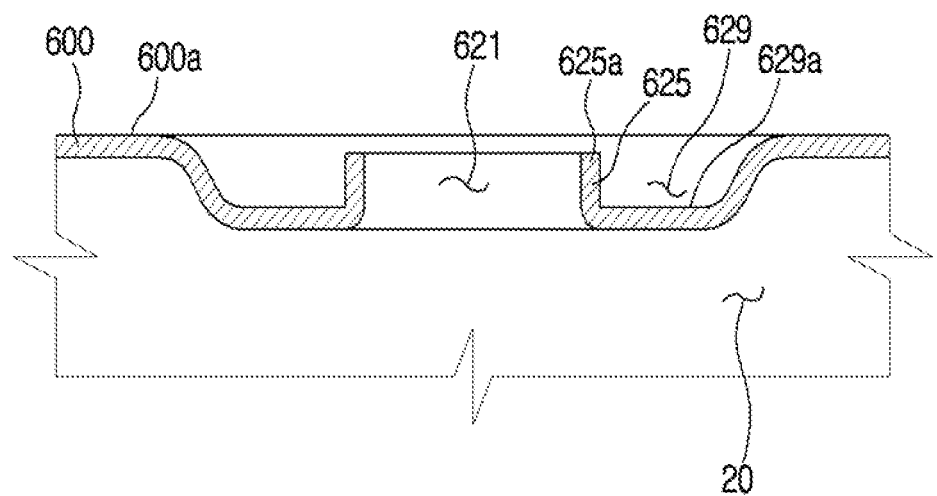

[Fig. 14]
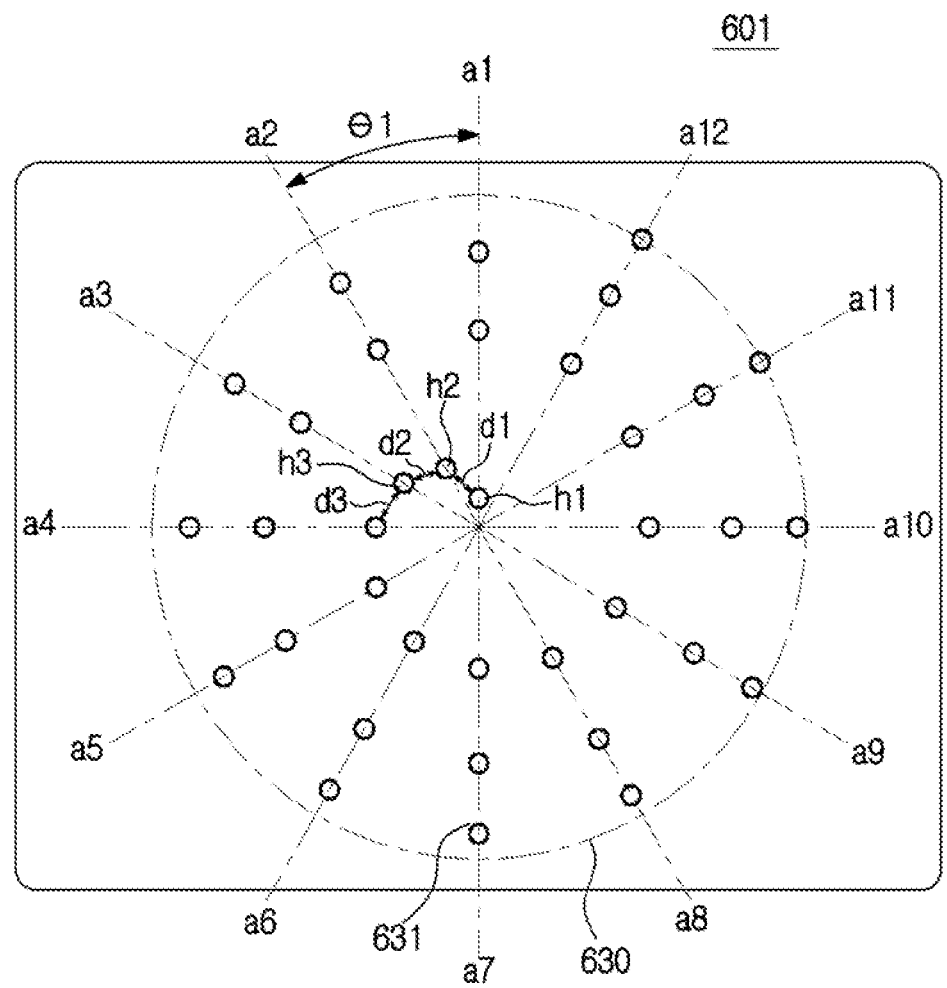

[Fig. 15]
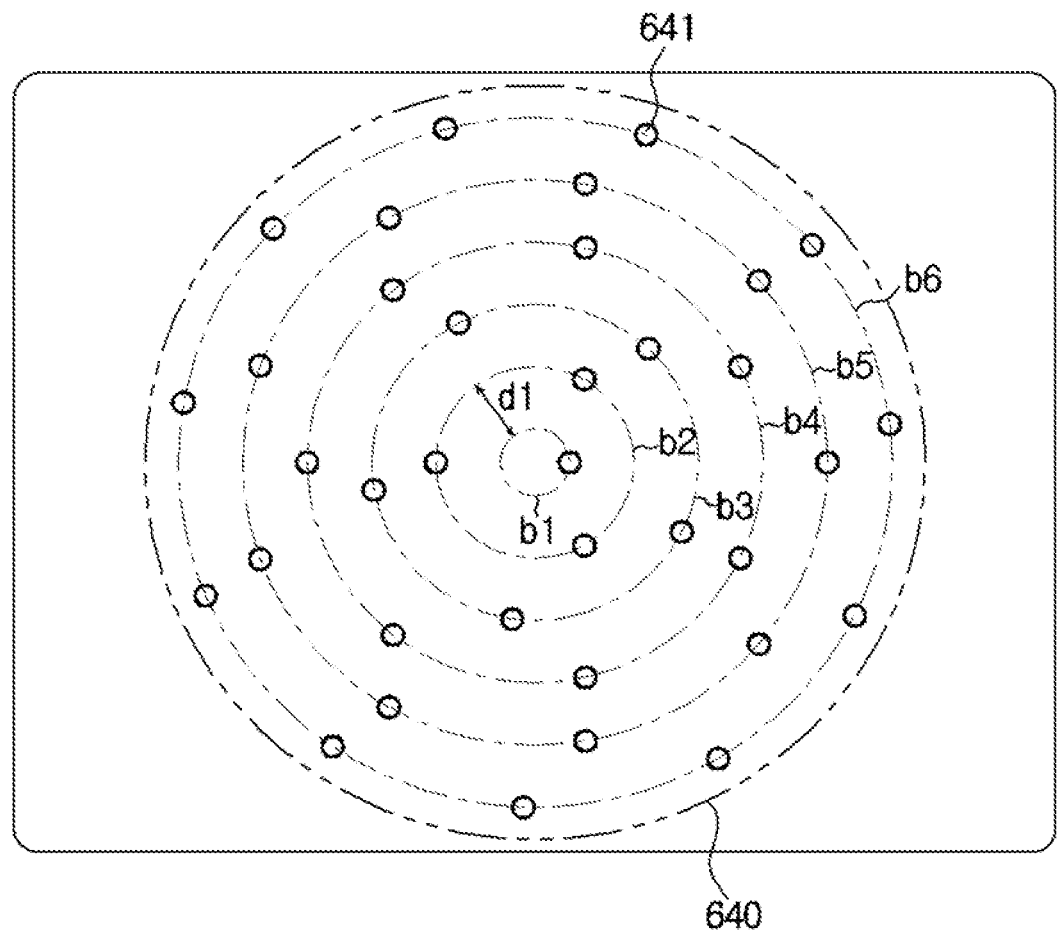
[Fig. 16]
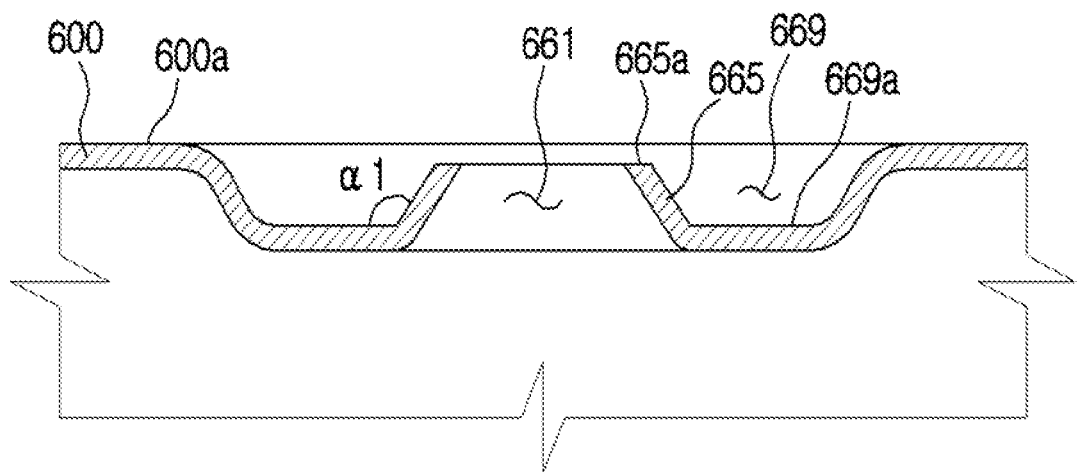

[Fig. 17]
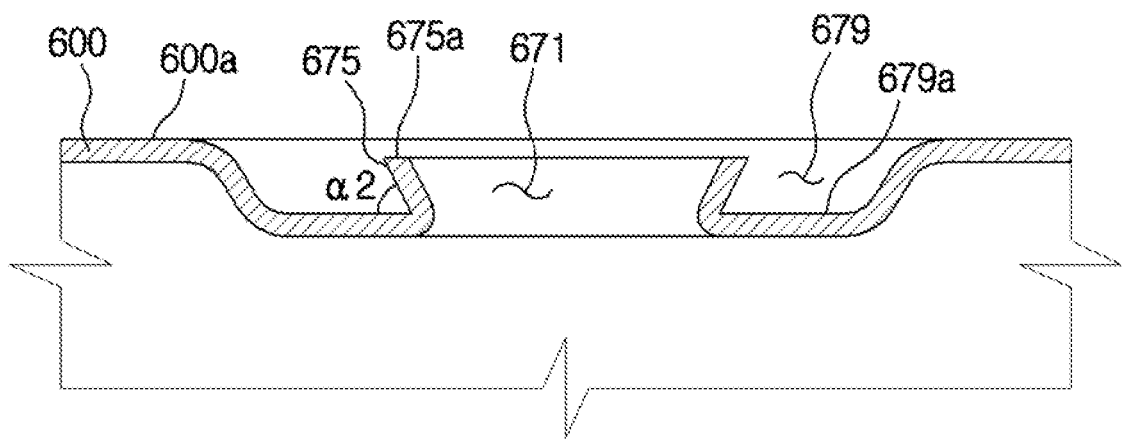
[Fig. 18]
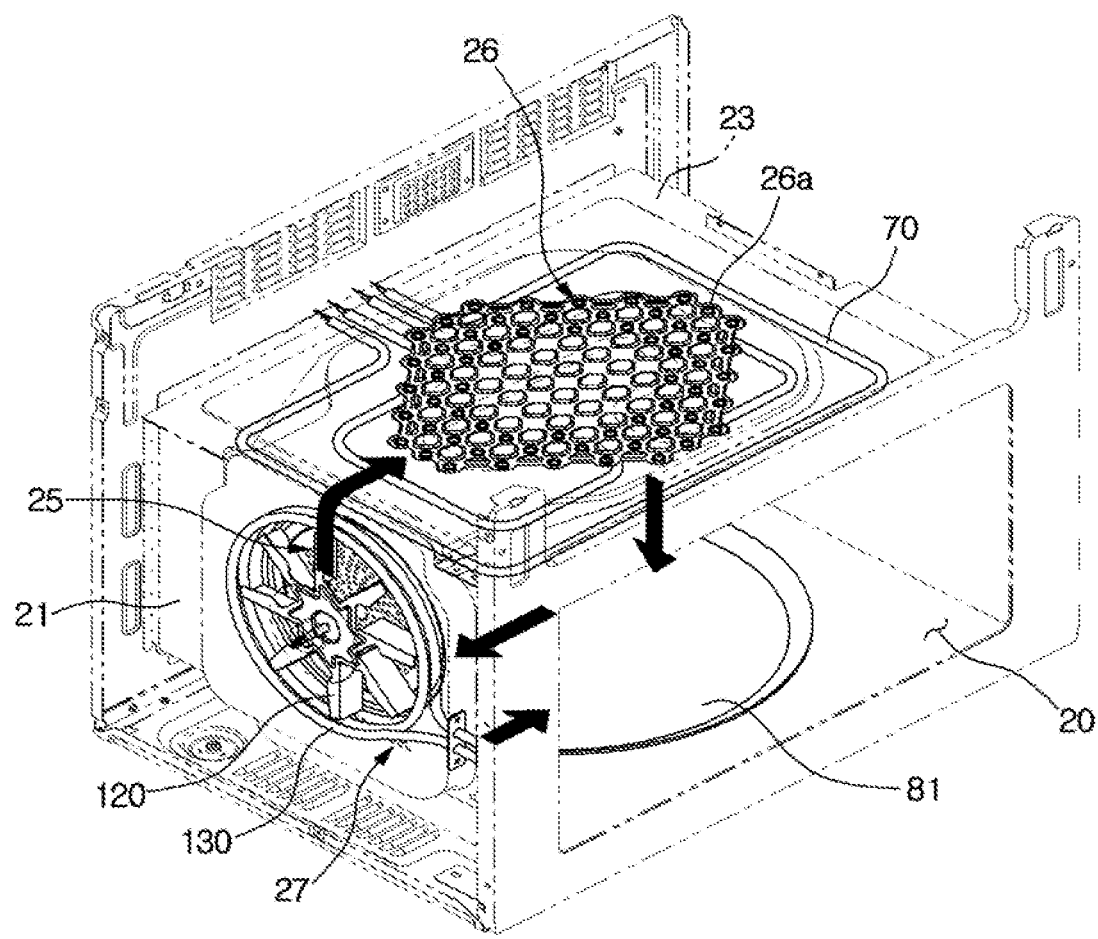

[Fig. 19]
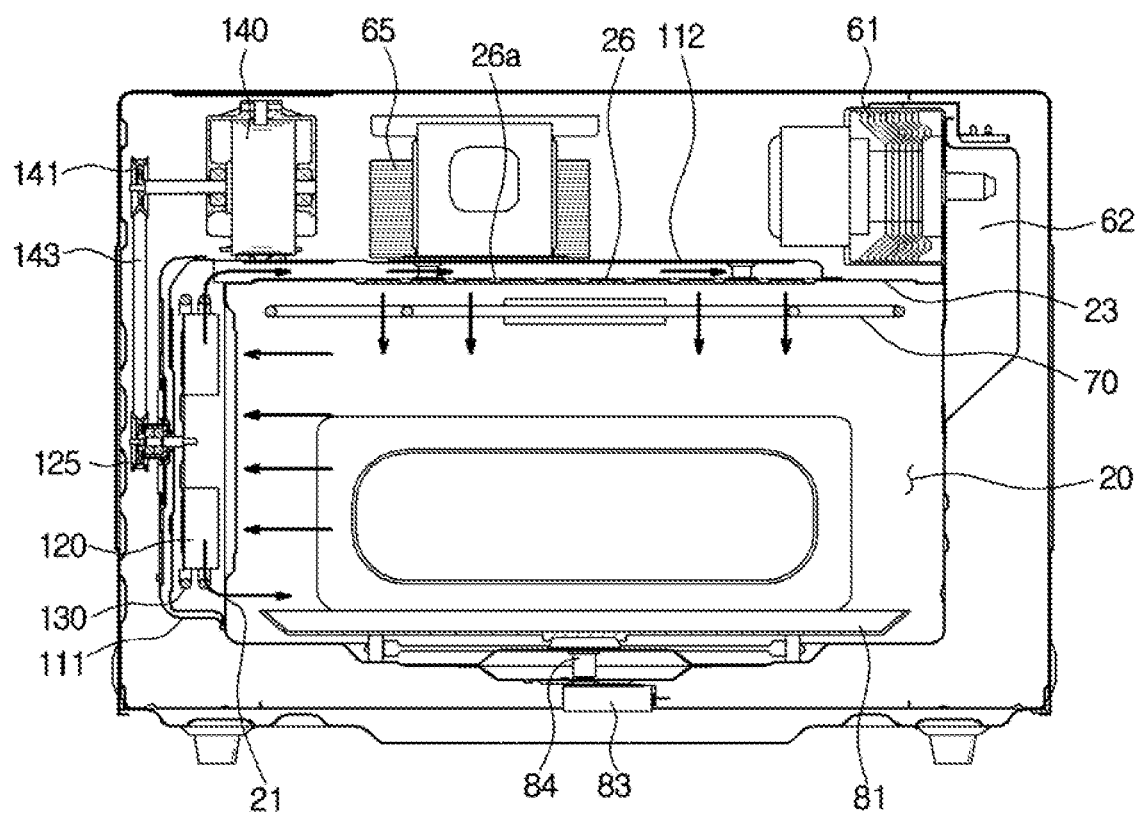

[Fig. 20]
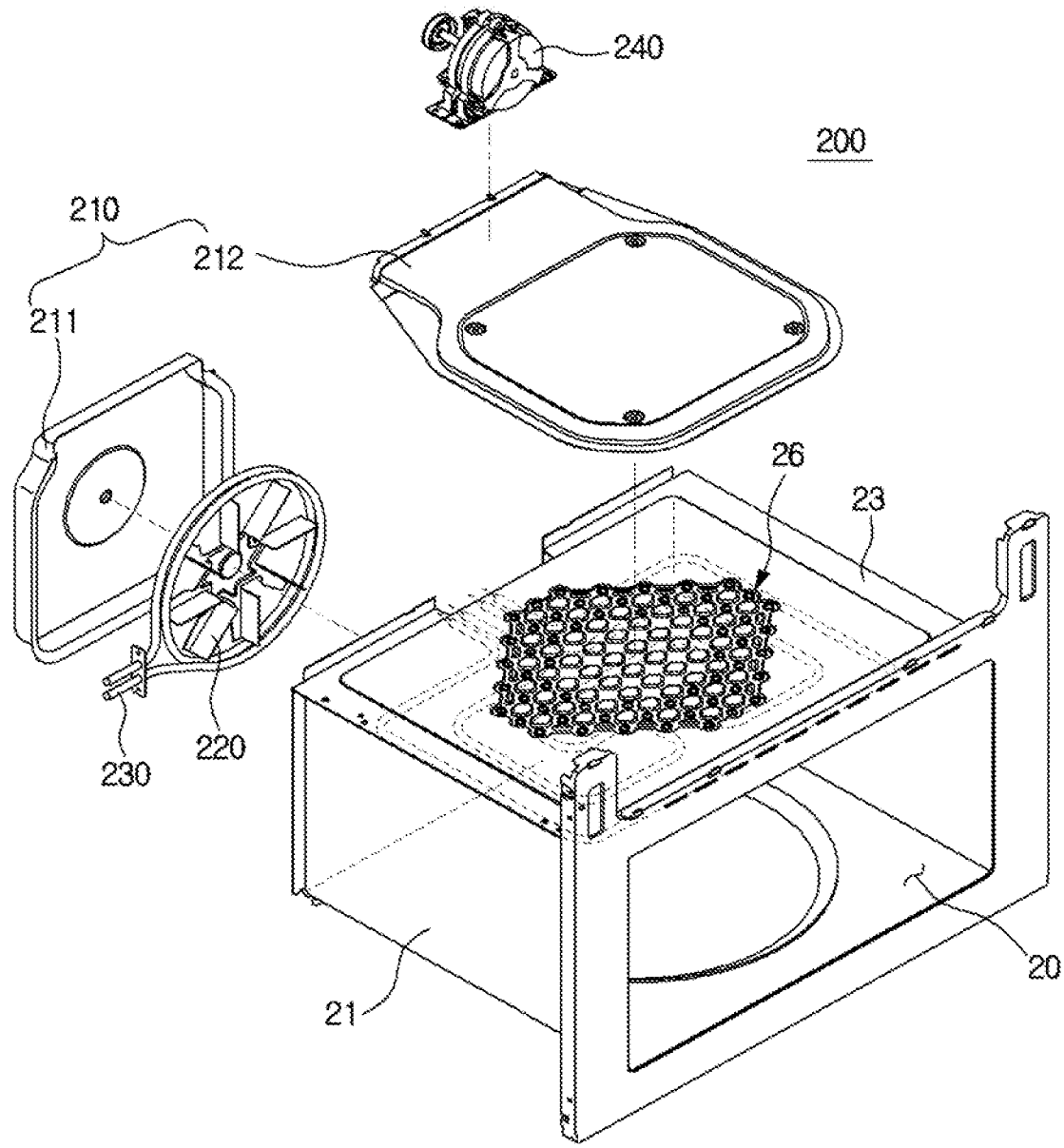

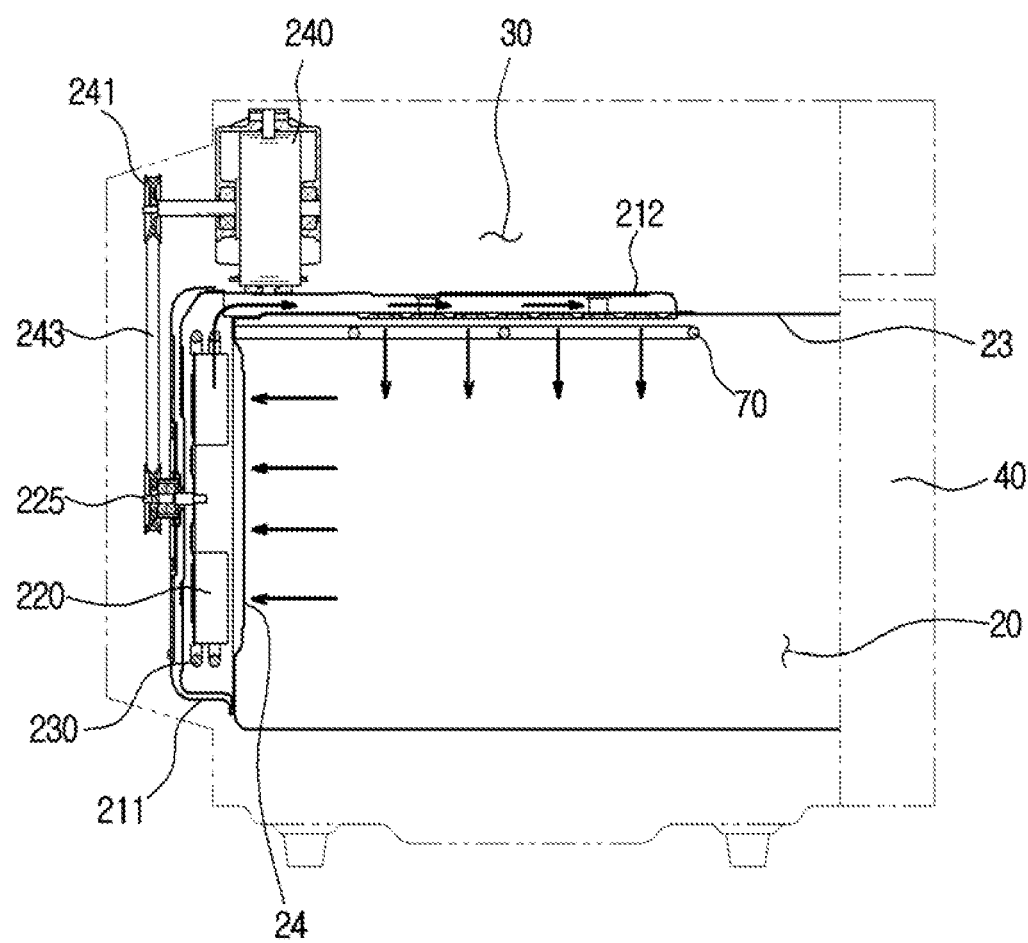
[Fig. 21]

[Fig. 22]
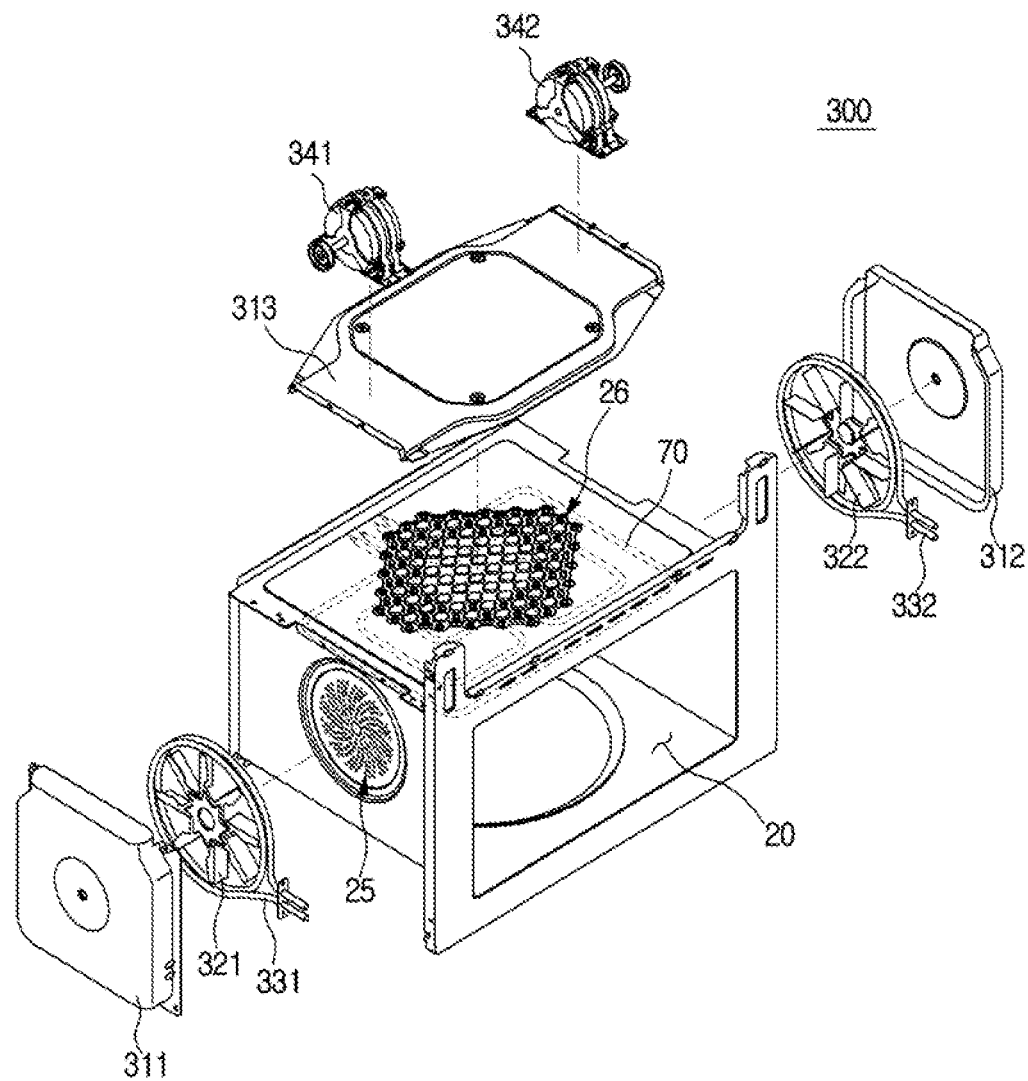

[Fig. 23]
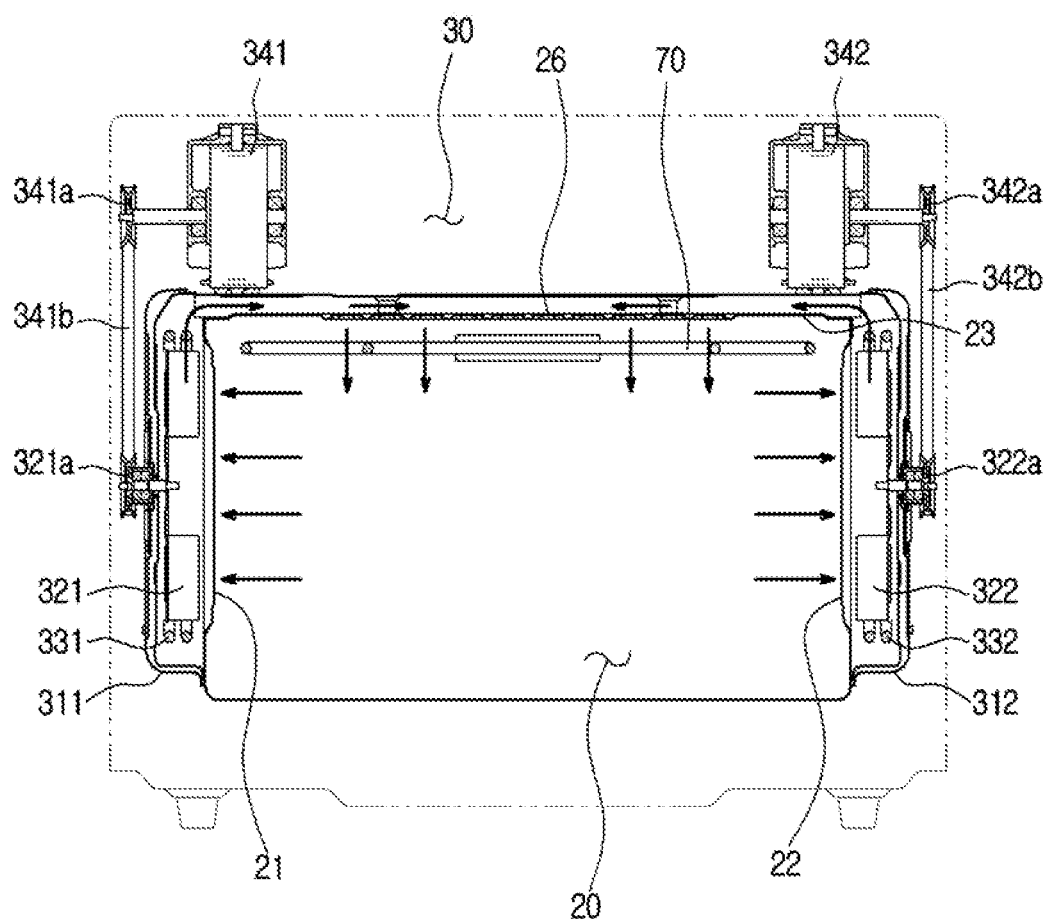

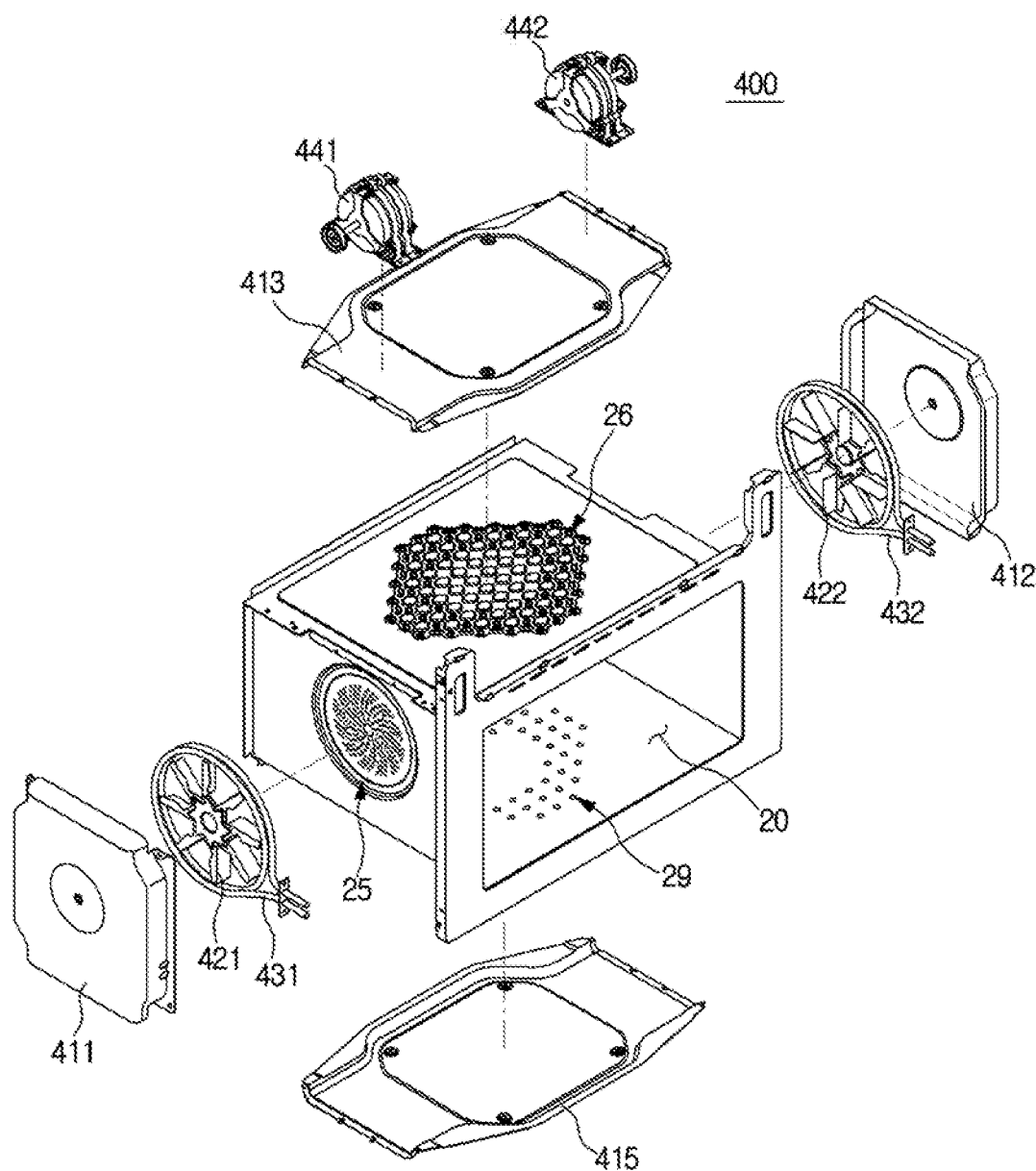
[Fig. 24]

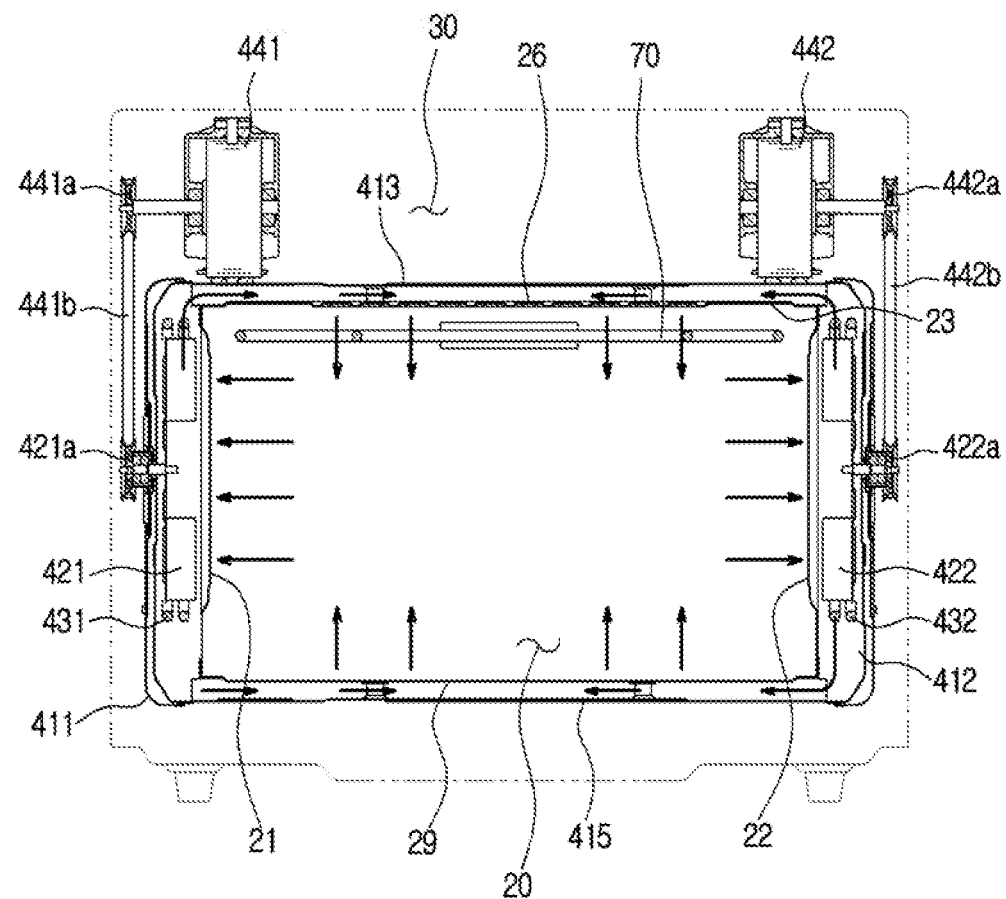
[Fig. 25]

COOKING APPARATUS

CROSS-REFERENCE TO RELATED APPLICATIONS

This application is a U.S. National Stage Application, which claims the benefit under 35 U.S.C. § 371 of PCT International Patent Application No. PCT/KR2015/004609, filed May 8, 2015, which claims the foreign priority benefit under 35 U.S.C. § 119 of Korean Patent Application No. 10-2014-0116255, filed Sep. 2, 2014, the contents of which are incorporated herein by reference.

TECHNICAL FIELD

The present invention relates to a cooking apparatus, and more particularly, to a cooking apparatus having an improved structure in which a shape and a pattern of an outlet hole through which high-temperature air is discharged into a cooking chamber is improved to enhance cooking performance.

BACKGROUND ART

Generally, a microwave oven is a cooking apparatus for heating food using a property of electromagnetic wave called microwave. The microwave oven generates heat from an inside of the food in a dielectric heating method and heats the food.

Recently, a cooking apparatus in which not only a high-frequency heating device used in the microwave oven to provide the microwave but also a grill heater for supplying radiant heat and a convection device for supplying convection heat are provided to heat food in various methods is being developed.

The convection device cooks the food using the convection heat. The convection device is configured to discharge high-temperature air into a cooking chamber in which food is located. The high-temperature air is discharged into the cooking chamber through one side surface of the cooking chamber. In this case, a portion of the food close to a side plate through which the high-temperature air is discharged and a portion thereof distant therefrom may not be evenly cooked. To prevent this problem, a tray for supporting the food in the cooking chamber is rotated. Also, the convection device is configured so that the high-temperature air does not directly collide with the food but indirectly transfers heat to the food, thereby cooking the food.

DISCLOSURE

Technical Problem

The present invention is directed to providing a cooking apparatus having an improved structure for enhancing cooking performance.

Also, the present invention is directed to providing a cooking apparatus having an improved structure in which high-temperature air directly collides with food, thereby cooking the food.

Also, the present invention is directed to providing a cooking apparatus having an improved structure for allowing high-temperature air to evenly transfer heat to an entire area of food.

Also, the present invention is directed to providing a cooking apparatus having an improved structure for preventing foreign substances from being generated at an outlet hole through which high-temperature air is discharged.

Technical Solution

In accordance with an aspect of the present disclosure, a cooking apparatus includes a casing, a cooking chamber provided inside the casing and including a discharge plate at which a plurality of outlet holes are formed, a tray provided at a bottom surface of the cooking chamber to support food, and a hot air discharging unit configured to discharge high-temperature air into the cooking chamber through the outlet holes, wherein the plurality of outlet holes are formed at a first area facing the tray.

The first area may include a blocking part and an outlet part, and the plurality of outlet holes may be formed at the outlet part in predetermined intervals, and the blocking part may be provided to block the air from being discharged into the cooking chamber.

The blocking part may be formed at a position facing a center of the tray.

The blocking part may be provided to have an area corresponding to 10% of the first area.

The first area may be provided in a diamond shape.

The cooking apparatus may further include a driving member configured to generate a rotating force transmitted to the tray.

The plurality of outlet holes may be spirally disposed from a center portion of the first area, and the plurality of outlet holes may be arranged so that a first distance between a first outlet hole of the plurality of outlet holes and a second outlet hole outwardly adjacent to the first outlet hole on a spiral line has a distance increased by a certain proportion from a second distance between the first outlet hole and a third outlet hole inwardly adjacent to the first outlet hole on the spiral line.

The plurality of outlet holes may be arranged to be sequentially rotated at a first angle on the spiral line based on the center portion of the first area.

In accordance with another aspect of the present disclosure, a cooking apparatus includes a casing, a cooking chamber provided inside the casing and including a discharge plate at which a plurality of outlet holes are formed, and a hot air discharging unit configured to discharge high-temperature air into the cooking chamber through the plurality of outlet holes, wherein each of the plurality of outlet holes includes a flange protruding in a direction opposite to a discharging direction of the air from the outlet holes.

A flange groove may be formed at a part of an outer surface of the discharge plate, and the flange may be formed at a lower surface of the flange groove.

The flange may be provided so that a cross section formed at one end of the flange is located between the outer surface of the discharge plate and the lower surface of the flange groove.

The flange may protrude in a direction vertical to the discharge plate.

The discharge plate may be provided as an upper plate forming an upper surface of the cooking chamber.

The plurality of outlet holes may be formed at a first area facing a tray formed at a bottom surface of the cooking chamber to support food.

The first area may include a blocking part and an outlet part, and a plurality of outlet holes may be formed at the outlet part in predetermined intervals, and the blocking part may be blocked to prevent the air from being discharged into the cooking chamber.

The blocking part may be formed to face a center of the tray.

The blocking part may be provided to have an area corresponding to 10% of the first area.

The plurality of outlet holes may be spirally arranged from a center portion of the first area.

In accordance with another aspect of the present disclosure, a cooking apparatus includes a casing, a cooking chamber provided inside the casing and including a discharge plate at which a plurality of outlet holes are formed, a tray provided at a bottom surface of the cooking chamber to support food, a driving member configured to generate a driving force for rotating the tray, and a hot air discharging unit configured to discharge high-temperature air into the cooking chamber through the plurality of outlet holes, wherein the plurality of outlet holes are formed at a first area facing the tray disposed at the bottom surface of the cooking chamber, and the first area is provided so that the number of outlet holes is increased outward from a center portion of the first area.

In accordance with another aspect of the present disclosure, a cooking apparatus includes a casing, a cooking chamber provided inside the casing and including a discharge plate at which a plurality of outlet holes are formed, a tray provided at a bottom surface of the cooking chamber to support food, a driving member configured to generate a driving force for rotating the tray, and a hot air discharging unit configured to discharge high-temperature air into the cooking chamber through the plurality of outlet holes, wherein the plurality of outlet holes are formed at a first area facing the tray disposed at the bottom surface of the cooking chamber, and the first area includes a blocking part formed at a position facing a center of the tray and an outlet part configured to surround the blocking part, and the plurality of outlet holes are formed at the outlet part in predetermined intervals, and the blocking part is blocked to prevent the air from being discharged into the cooking chamber.

Each of the plurality of outlet holes may include a flange protruding in a direction opposite to a discharging direction of the air from the outlet holes.

A flange groove may be formed at a part of an outer surface of the discharge plate, and the flange may be formed at a lower surface of the flange groove.

The flange may be provided so that a cross section formed at one end of the flange is located between the outer surface of the discharge plate and the lower surface of the flange groove.

Advantageous Effects

According to one embodiment of the present invention, since the high-temperature air directly collides with the food, the food can be cooked, and thus the cooking time can be reduced.

Also, since the high-temperature air evenly collides with the entire area of the food and the food can be evenly cooked, the cooking performance of the cooking apparatus can be enhanced.

Also, the space inside the cooking apparatus can be efficiently used by efficiently disposing the electronic components inside the electronic chamber.

Also, foreign substances can be prevented from being generated at the outlet hole through which the air is discharged.

DESCRIPTION OF DRAWINGS

FIG. 1 is a perspective view illustrating an exterior of a cooking apparatus according to one embodiment of the present invention.

FIG. 2 is a perspective view illustrating a state in which a door is opened in the cooking apparatus according to one embodiment of the present invention.

FIG. 3 is an exploded perspective view illustrating a state in which the casing and the door are separated from the cooking apparatus according to one embodiment of the present invention.

FIG. 4 is a cross-sectional view of the cooking apparatus taken along line A-A' of FIG. 2.

FIG. 5 is an exploded perspective view illustrating a configuration of the hot air discharging unit of the cooking apparatus according to one embodiment of the present invention.

FIG. 6 is a perspective view illustrating a state in which the hot air discharging unit is removed from the cooking apparatus according to one embodiment of the present invention.

FIG. 7 is a view illustrating the first plate of the cooking apparatus according to one embodiment of the present invention.

FIG. 8 is a view illustrating the second plate of the cooking apparatus according to one embodiment of the present invention.

FIG. 9 is a view illustrating a state in which a fan and a heater are installed at the first plate of the cooking apparatus according to one embodiment of the present invention.

FIG. 10 is a side view illustrating a state in which the fan and the heater are installed at the first plate of FIG. 9.

FIG. 11 is a view illustrating a discharge plate according to one embodiment of the present invention.

FIG. 12 is a view enlargedly illustrating an outlet hole, a flange and a flange groove formed at the discharge plate of FIG. 11.

FIG. 13 is a view illustrating cross sections of the outlet hole, the flange and the flange groove formed at the discharge plate of FIG. 12.

FIG. 14 is a view illustrating a first modified example of the discharge plate of FIG. 11.

FIG. 15 is a view illustrating a second modified example of the discharge plate of FIG. 11.

FIG. 16 is a view illustrating a first modified example of the flange of FIG. 13.

FIG. 17 is a view illustrating a second modified example of the flange of FIG. 13.

FIGS. 18 and 19 are views illustrating an air flow in the cooking chamber and the hot air discharging unit of the cooking apparatus according to one embodiment of the present invention.

FIG. 20 is a view illustrating a configuration of a hot air discharging unit according to a first modified example of the present invention.

FIG. 21 is a view illustrating an air flow in the hot air discharging unit and the cooking chamber of FIG. 20.

FIG. 22 is a view illustrating a configuration of a hot air discharging unit according to a second modified example of the present invention.

FIG. 23 is a view illustrating an air flow in the hot air discharging unit and the cooking chamber of FIG. 22.

FIG. 24 is a view illustrating a configuration of a hot air discharging unit according to a third modified example of the present invention.

FIG. 25 is a view illustrating an air flow in the hot air discharging unit and the cooking chamber of FIG. 24.

MODES OF THE INVENTION

Hereinafter, a robot cleaner according to one embodiment of the present invention will be described in detail with reference to the accompanying drawings.

The electronic chamber 30 may be provided as a space formed at an upper portion of a cooking chamber 20 between the cooking chamber 20 and a casing 10.

The cooking chamber 20 may be provided in a shape of which a front surface is opened. The opened front surface of the cooking chamber 20 may be opened and closed by a door 40. The door 40 may be hinge-coupled to one side of a front surface of the casing 10 and may be provided to open and close the cooking chamber 20.

The cooking chamber 20 may be formed by coupling a plurality of plates. According to one example, the cooking chamber 20 may include a side plate for forming a side surface of the cooking chamber 20, an upper plate for forming an upper surface of the cooking chamber 20 and a lower plate for forming a lower surface of the cooking chamber 20. The side plate, the upper plate and the lower plate may be coupled by a welding. Otherwise, the side plate, the upper plate and the lower plate may be coupled by a screw-coupling. Also, the cooking chamber 20 may be formed by bending one plate.

A control panel 50 may be installed at an upper portion of the front surface of the cooking apparatus 1. The control panel 50 may be provided to operate the electronic components provided inside the electronic chamber 30.

The control panel 50 may include an input part 59 and a display part (not shown). The input part 59 may be provided to allow a user to input a command for an operation of the cooking apparatus, such as a cooking function, a cooking mode and a cooking time. The input part 59 may be provided to allow the user to select and input a cooking mode using microwave, a cooking mode using a grill heater, a first cooking mode using a hot air discharging unit 100 which will be described later and a second cooking mode. According to one example, the input part 59 may have a plurality of switches for allowing the user to select the cooking mode. The plurality of switches of the input part 59 may be provided in a touch sensing method.

The display part may be provided to display a condition set by the user and an operation state according to the condition using a character, a number and a symbol.

FIG. 3 is an exploded perspective view illustrating a state in which the casing and the door are separated from the cooking apparatus according to one embodiment of the present invention, and FIG. 4 is a cross-sectional view of the cooking apparatus taken along line A-A' of FIG. 2.

Referring to FIGS. 3 and 4, the cooking apparatus 1 may include a magnetron 61 for generating the microwave. The magnetron 61 may be provided in the electronic chamber 30 and may generate the microwave radiated into the cooking chamber 20.

According to one example, the magnetron 61 may be installed at an outer surface of the upper plate 23 of the cooking chamber 20. The microwave generated from the magnetron 61 may be radiated into the cooking chamber 20 through a wave guide 62. The wave guide 62 may be provided so that one side thereof is connected to the magnetron 61 and the other side thereof is connected to one side surface of the cooking chamber 20.

A high voltage transformer (HVT) 65, a high voltage condenser 66, a high voltage diode (not shown), a noise filter 69 and so on forming a driving circuit for driving the magnetron 60 may be installed in the electronic chamber 30. The high voltage transformer 65, the high voltage condenser 66, the high voltage diode (not shown) and the noise filter 69 may be installed at the outer surface of the upper plate 23 of the cooking chamber 20. As described above, all of the high voltage transformer 65, the high voltage condenser 66, the high voltage diode (not shown) and the noise filter 69 may be provided to be located in the electronic chamber 30 provided above the cooking chamber 20.

Although not illustrated, a cooling fan (not shown) for blowing air in the electronic chamber 30 toward an outside of the cooking apparatus 1 may be disposed in the electronic chamber 30. The cooling fan may move heat generated from the electronic components, such as the magnetron 61, the high voltage transformer 65 and the high voltage condenser 66, provided inside the electronic chamber 30 to the outside of the cooking apparatus 1.

According to one embodiment of the present invention, the electronic components such as the magnetron 61, the high voltage transformer 65, the high voltage condenser 66, the high voltage diode (not shown) and the noise filter 69 may be disposed in the electronic chamber 30 located above the cooking chamber 20. Therefore, in the cooking apparatus 1, a space occupied by the cooking chamber 20 in an internal space of the casing 10 may be increased. As described above, in the cooking apparatus 1, the internal space of the casing 10 may be efficiently used.

The cooking apparatus 1 may further include a grill heater 70 for providing radiant heat to the food and cooking the food. The grill heater 70 may be located inside the cooking chamber 20. The grill heater 70 may be installed to be located at the upper portion of the cooking chamber 20. The grill heater 70 may be disposed to face the upper surface of the cooking chamber 20. The grill heater 70 may generate the radiant heat, and the generated radiant heat may be transferred to the food, and thus the food may be cooked.

A tray 81 on which the food to be cooked is put may be provided inside the cooking chamber 20. The tray 81 may be connected to a driving member 83 installed outside the cooking chamber 20 through a connector 84. The driving member 83 may generate a driving force for rotating the tray 81. The driving force generated from the driving member 83 may be transmitted to the tray 81 through the connector 84 and may rotate the tray 81. Selectively, the driving member 83 may not be provided.

Hereinafter, the hot air discharging unit 100 according to one embodiment of the present invention will be described. The hot air discharging unit 100 may generate high-temperature air provided into cooking chamber 20. The hot air discharging unit 100 may be configured so that the high-temperature air is discharged into the cooking chamber 20 and directly collides with the food and thus heat is transferred to the food.

FIG. 5 is an exploded perspective view illustrating a configuration of the hot air discharging unit of the cooking apparatus according to one embodiment of the present invention.

Referring to FIGS. 3 to 5, the hot air discharging unit 100 may include a duct member 110. The duct member 110 may be provided in the electronic chamber 30. The duct member 110 may be installed at an outer surface of the cooking chamber 20. The duct member 110 may guide the high-temperature air discharged into the cooking chamber 20 to be moved from an outside of the cooking chamber 20 in a certain direction.

The duct member 110 may be provided in a shape extending from a first plate to a second plate. According to one example, the first plate may be provided as a first plate 21 provided at one side surface of the cooking chamber 20, and the second plate may be provide as the upper plate 23. Otherwise, the first plate and the second plate may be provided as plates different from each other among a plurality of plates forming the cooking chamber 20. Hereinafter, for convenience of explanation, it is assumed that the first plate is the first plate 21 provided at one side surface of the cooking chamber 20 and the second plate is the upper plate 23.

The duct member 110 may be provided at an outside of the cooking chamber 20 in a shape extending from the first plate 21 to the second plate 23. The duct member 110 may guide internal air to be moved from the first plate 21 to the second plate 23. The duct member 110 may be disposed so that an inlet part 25 and a first outlet part 26 are located therein. The duct member 110 may be disposed so that the inlet part 25, the first outlet part 26 and a second outlet part 27 are located therein.

The duct member 110 may include a first duct 111 and a second duct 112. The first duct 111 may be installed an outer surface of the first plate 21. The first duct 111 may be installed so that the inlet part 25 is located therein. The first duct 111 may be installed so that the inlet part 25 and the second outlet part 27 are located therein. The first duct 111 may be provided so that a lower end thereof is located at a lower side further than the second outlet part 27 and an upper end thereof extends upward to be connected to the second duct 112. According to one example, the first duct 11 may include a first inner duct 111a and a first outer duct 111b. Alternatively, the first duct 111 may be provided as one plate.

The second duct 112 may be installed at an outer surface of the second plate 23. The second duct 112 may be installed so that the first outlet part 26 is located therein. The second duct 112 may be provided at the outer surface of the second plate 23 so that one side thereof is connected to the first duct 111 and the other side thereof extends toward a third plate 22 facing the first plate 21.

The duct member 110 may be provided to be in communication with the cooking chamber 20. According to one example, the duct member 110 may be in communication with an inside of the cooking chamber 20 through the inlet part 25 formed at the first plate 21 of the cooking chamber 20 and the first outlet part 26 formed at the second plate 23. The inlet part 25 and the first outlet part 26 may be respectively formed at areas of the first plate 21 and the second plate 23 facing the duct member 110. Therefore, the air in the cooking chamber 20 may be discharged to the duct member 110 through the inlet part 25 and the first outlet part 26 or may be introduced from the duct member 110 into the cooking chamber 20.

FIG. 6 is a perspective view illustrating a state in which the hot air discharging unit is removed from the cooking apparatus according to one embodiment of the present invention, FIG. 7 is a view illustrating the first plate of the cooking apparatus according to one embodiment of the present invention, and FIG. 8 is a view illustrating the second plate of the cooking apparatus according to one embodiment of the present invention.

Referring to FIGS. 3 to 8, the inlet part 25 in communication with the duct member 110 may be formed at the cooking chamber 20. According to one example, the inlet part 25 may be formed at the first plate 21 at which the duct member 110 is installed. The inlet part 25 may be formed at a center area of the first plate 21.

The inlet part 25 may include a plurality of inlet holes 25a. The plurality of inlet holes 25a may be disposed at the inlet part 25 in predetermined intervals. The inlet part 25 may serve as a path through which the air in the cooking chamber 20 is moved to the duct member 110 by the hot air discharging unit 100 which will be described later.

The first outlet part 26 which may be in communication with the duct member 110 may be further formed at the cooking chamber 20. According to one example, the first outlet part 26 may be formed at the second plate 23. The first outlet part 26 may be formed at a center area of the second plate 23. The first outlet part 26 may be provided to be located inside the second duct 112. The first outlet part 26 may be formed at a position facing the tray 81 provided inside the cooking chamber 20. The first outlet part 26 may be provided as a path through which the high-temperature air moved through an inner passage 112a of the second duct 112 is moved into the cooking chamber 20.

The first outlet part 26 may include a plurality of outlet holes 26a. The plurality of outlet holes 26a may be disposed at the first outlet part 26 in predetermined intervals. According to one example, the outlet holes 26a may not be formed at a center area of the outlet part 26. At this point, the plurality of outlet holes 26a may be formed at only an edge area of the first outlet part 26. Otherwise, the plurality of outlet holes 26a may be formed at an entire area of the first outlet part 26 in predetermined intervals.

The second outlet part 27 may be further formed at the cooking chamber 20. The second outlet pan 27 may be formed at the first plate 21 at which the inlet part 25 is formed. The second outlet part 27 may be formed at the first plate 21 to be located under the inlet part 25. The second outlet part 27 may be provided so that the air is discharged to a lower area of the cooking chamber 20 through the first plate 21.

The second outlet part 27 may include a plurality of outlet holes 27a. The plurality of outlet holes 27a may be disposed at the second outlet part 27 in predetermined intervals. The second outlet part 27 may serve as a path together with the first outlet part 26 through which external air of the cooking chamber 20 is moved into the cooking chamber 20 by the hot air discharging unit 100.

As illustrated in FIG. 7, protruding portions 23a and 23b may be formed at the second plate 23. The protruding portions 23a and 23b may be formed at an edge area of the second plate 23 when the second plate 23 and the first plate 21 are coupled by the welding. The protruding portions 23a and 23b may be divided into a first protruding portion 23a located outside the duct member 110 and a second protruding portion 23b located inside the duct member 110.

The first protruding portion 23a may be provided to protrude to an outside of the first plate 21. Otherwise, the second protruding portion 23b may be bent downward and may be coupled to an inner surface of the first plate 21. The second protruding portion 23b may be welded and coupled to the inner surface of the first plate 21. Accordingly, a passage 23c for connecting the first duct III with the second duct 112 may be formed at a space formed in the duct member 110 by the bending of the second protruding portion 23b.

FIG. 9 is a view illustrating a state in which a fan and a heater are installed at the first plate of the cooking apparatus according to one embodiment of the present invention, and FIG. 10 is a side view illustrating a state in which the fan and the heater are installed at the first plate of FIG. 9.

Referring to FIGS. 3 to 10, the hot air discharging unit 100 may further include a fan 120. The fan 120 may be installed inside the duct member 110. The fan 120 may blow air from an inside of the duct member 110 to a certain position. According to one example, the fan 120 may be disposed to move the air introduced into the duct member 110 through the inlet part 25 to the first outlet part 26. The fan 120 may also be disposed to move the air introduced into the duct member 110 through the inlet part 25 to the second outlet part 27.

According to one example, the fan 120 may include a centrifugal fan. A rotating shaft 121 is formed at a center of the centrifugal fan, and the centrifugal fan may include a plurality of blades 122 radially extending from a circumference of the rotating shaft 121. The centrifugal fan may blow the air moved to an inside of the centrifugal fan through a center portion thereof in a radial direction of the rotating shaft 121 while the plurality of blades 122 are rotated about the rotating shaft 121. Otherwise, the fan 120 may be provided as another kind of fan such as an axial-flow fan. Hereinafter, for convenience of explanation, it is assumed that the fan 120 is provided as the centrifugal fan.

According to one example, the centrifugal fan 120 may be provided to have a diameter d of 154 mm. The centrifugal fan 120 may be provided so that a width h of the blade is 20 mm. As described above, since the hot air discharging unit 100 provides the centrifugal fan 120 larger than an existing fan using a side space of the cooking chamber 20, a discharging speed of the air discharged into the cooking chamber 20 may be easily increased.

The centrifugal fan 120 may be disposed inside the first duct 111. The first duct 111 may be provided so that the centrifugal fan 120 is installed therein. According to one example, the first duct 111 may have a size of 200 mm×200 mm so that the centrifugal fan 120 is installed therein and may be provided to be spaced apart from the first plate 21 in a distance of 30 mm.

The centrifugal fan 120 may be disposed inside the first duct 111 to face the first plate 21. According to one example, the centrifugal fan 120 may be provided at a position facing the inlet part 25. The centrifugal fan 120 may be disposed so that a center portion thereof through which the air is suctioned faces the inlet part 25. The centrifugal fan 120 may be installed so that a lower end thereof is located at an upper side further than the second outlet part 27. Accordingly, the air introduced into the duct member 110 through the inlet part 25 may be moved to the first outlet part 26 or the second outlet part 27 by the centrifugal fan 120.

The hot air discharging unit 100 may further include a heater 130. The heater 130 may heat the air in the duct member 10 to cook the food.

The heater 130 may be disposed inside the duct member 110. The heater 130 may be provided inside the first duct 111. According to one example, the heater 130 may be provided to surround the centrifugal fan 120. The heater 130 may be provided in a ring shape surrounding the centrifugal fan 120. The heater 130 may be installed so that a lower end thereof is located at an upper side further than the second outlet part 27. The heater 130 may be provided at a position surrounding the plurality of blades provided at the centrifugal fan 120 and thus may heat the air discharged from the centrifugal fan 120. The heater 130 may be provided so that a temperature thereof is controlled according to the cooking mode.

Referring to FIGS. 3 and 4 again, the hot air discharging unit 100 may further include a motor 140. The motor 140 may generate a driving force.

The motor 140 may be disposed outside the duct member 110. According to one example, the motor 140 may be located above the second duct 112. Therefore, a space formed between the casing 10 and left and right surfaces of the cooking chamber 20 may be minimized, and thus an internal space of the cooking apparatus 1 may be efficiently used.

The motor 140 may include a first pulley 141 and a belt 143. The first pulley 141 may be formed at one side of the motor 140. The first pulley 141 may be provided at a position facing a second pulley 125 connected to the centrifugal fan 120. The second pulley 125 may be installed outside the first duct 111 and may be provided to be connected to the centrifugal fan 120. The first pulley 141 and the second pulley 125 may be connected by the belt 143. The belt 143 may transmit a rotating force of the first pulley 141 to the second pulley 125. Accordingly, the motor 140 may transmit the driving force to the centrifugal fan 120 through the belt 143.

Referring to FIG. 4, the hot air discharging unit 100 may further include a controller 150.

The controller 150 may be electrically connected to the motor 140 and may control a rotating speed and a rotating direction of the motor 140. The controller 150 may control a speed of the air discharged from the first outlet part 26 by controlling the rotating speed of the motor 140. The controller 150 may control a colliding speed of the air discharged from the first outlet pan 26 with the food by controlling the rotating speed of the motor 140. Therefore, the controller 150 may control the cooking mode provided by the hot air discharging unit 100.

The controller 150 may control the colliding speed of the air discharged from the first outlet part 26 formed at the second plate 23 with the food by controlling the rotating speed of the fan 120 according to the cooking mode. In the first cooking mode, the controller 150 may control the air discharged from the first outlet part 26 to collide with the food at a first speed, thereby allowing the food to be cooked. The first speed may be 1 m/s or less. The first cooking mode may be provided so that the air discharged from the first outlet part 26 transfers heat to the food by convection and thus the food is cooked.

In the second cooking mode, the controller 150 may control the air discharged from the first outlet part 26 to collide with the food at a second speed, thereby allowing the food to be cooked. The second speed may be 1 to 5 m/s. Herein, when the second speed is 2 to 3 m/s, cooking efficiency of the cooking apparatus 1 may be enhanced. In the second cooking mode, the controller 150 may control the air to be discharged from the first outlet part 26 at a speed of about 10 m/s. The second cooking mode may be provided so that the food is cooked by heat exchange generated while the air discharged from the first outlet part 26 directly collides with the food.

Due to the above-described configuration, the hot air discharging unit 100 may discharge the high-temperature air into the cooking chamber 20. The hot air discharging unit 100 may control a speed of the air discharged into the cooking chamber 20 according to the cooking mode selected by the user in the cooking apparatus 1.

For example, the hot air discharging unit 100 may allow the high-temperature air discharged into the cooking chamber 20 to transfer heat to the food while directly colliding with the food. Also, the hot air discharging unit 100 may allow the high-temperature air discharged into the cooking chamber 20 to indirectly transfer heat to the food through the convection.

The cooking apparatus 1 may control the speed of the air discharged into the cooking chamber 20 according to the food to be cooked. For example, when bread rising in a cooking process or the food having a large volume is cooked, the discharging speed may be reduced so that heat is indirectly transferred to the food.

Otherwise, in the case of the food having a small volume, such as pizza, the discharging speed may be increased so that heat is transferred to the food while the air directly collides with the food.

Hereinafter, a discharge plate of the cooking apparatus according to one embodiment of the present invention will be described.

FIG. 11 is a view illustrating a discharge plate according to one embodiment of the present invention, FIG. 12 is a view enlargedly illustrating an outlet hole, a flange and a flange groove formed at the discharge plate of FIG. 11, and FIG. 13 is a view illustrating cross sections of the outlet hole, the flange and the flange groove formed at the discharge plate of FIG. 12.

Referring to FIGS. 11 to 13, a discharge plate 600 may be provided as one of the plurality of plates forming the cooking chamber 20. Hereinafter, the discharge plate 600 is defined as a plate of the cooking chamber 20 in which the first outlet holes 26a is formed.

According to one embodiment, the discharge plate 600 may be provided as the upper plate 23 forming the upper surface of the cooking chamber 20. Otherwise, the discharge plate 600 may be provided as one of the plurality of plates forming the side surfaces of the cooking chamber 20.

An outlet part 613 through which the air is discharged into the cooking chamber 20 may be formed at the discharge plate 600. The outlet part 613 may be provided inside a first area 610 of the discharge plate 600. The first area 610 may be formed in a diamond shape. The first area 610 may include a blocking part 611 and the outlet part 613.

The blocking part 611 may be disposed at a center of the first area 610. The blocking part 611 may be formed at a position facing a center of the tray 81 provided at a bottom surface of the cooking chamber 20. The blocking part 611 may be formed at a position overlapped with a rotating axis of the tray 81 provided at the bottom surface of the cooking chamber 20 when being seen from an upper side. The blocking part 611 may be provided to have an area corresponding to 10% of the first area 610. An outlet hole 621 through which the air is moved into the cooking chamber 20 is not provided at the blocking part 611. Therefore, the air may be blocked from being moved into the cooking chamber 20 through the blocking part 611 of the discharge plate 600.

The outlet part 613 may include an area of the first area 610 except the blocking part 611. The outlet part 613 may be provided as an area of the first area 610 having a shape surrounding the blocking part 611. The outlet part 613 may be provided to allow the air to be discharged into the cooking chamber 20.

The outlet part 613 may have a plurality of outlet holes 621. The plurality of outlet holes 621 may be disposed at the outlet part 613 in predetermined intervals. The food may be cooked while the air discharged into the cooking chamber 20 through the plurality of outlet holes 621 may directly or indirectly collide with the food.

The discharge plate 600 may have the blocking part 611 when the tray formed to be rotatable is provided inside the cooking chamber 20. When the tray formed to be rotatable is provided inside the cooking chamber 20, the food may be cooked while being rotated in a supported state on the tray. In this case, there may be a difference in a cooked state between a center area of the food which is relatively less rotated and an edge area thereof. Therefore, an amount of the high-temperature air discharged to the center area of the food may be controlled to be less than that of the high-temperature air discharged to the edge area, and thus the entire food may be evenly cooked.

Otherwise, when the tray provided inside the cooking chamber 20 is formed not to be rotatable, the blocking part 611 may not be provided. In this case, the entire first area 610 of the discharge plate 600 may be provided as the outlet part 613.

The outlet hole 621 may include a flange 625. The flange 625 may be provided in a shape protruding in a direction opposite to the discharging direction of the air discharged from the outlet hole 621. According to one example, the flange 625 may be provided in a shape protruding in a direction vertical to the discharge plate 600.

A flange groove 629 may be formed at at least a part of an outer surface of the discharge plate 600. The flange groove 629 may be formed at the first area 610 of the discharge plate 600. Therefore, the first area 610 may have a stepped surface. The flange groove 629 may be provided at the first area 610 in a shape surrounding the flange 625. In other words, the flange 625 may be formed at a lower surface 629a of the flange groove 629.

The flange 625 may be provided so that one side thereof is connected to the lower surface 629a of the flange groove 629 and the other side thereof extends in a direction opposite to the discharging direction of the air discharged from the outlet hole 621. The flange 625 may have a cross section 625a formed at an end thereof extending to the outside of the cooking chamber 20.

The cross section 625a may be located between an outer surface 600a of the discharge plate 600 and the lower surface 629a of the flange groove 629. The cross section 625a may be provided to be located at the same position as the outer surface 600a of the discharge plate 600 or inside the flange groove 629. Therefore, the air moved from the first area 610 of the discharge plate 600 may be easily introduced into the outlet hole 621 without interference with the flange 625.

The flange 625 may guide the air introduced into the cooking chamber 20 through the outlet hole 621 to have directivity. Since the flange 625 protrudes in a direction vertical to the lower surface 629a of the flange groove 629 and the discharge plate 600, the air may be discharged from the outlet hole 621 in the direction vertical to the lower surface 629a of the flange groove 629 and the discharge plate 600.

FIG. 14 is a view illustrating a first modified example of the discharge plate of FIG. 11.

Referring to FIG. 14, a discharge plate 601 is different from the discharge plate 600 of FIG. 11 in that an outlet hole 631 formed at a first area 630 is disposed in a different shape therefrom, and other configurations are the same as those thereof. Hereinafter, description will be provided centering on a difference from the discharge plate 600 of FIG. 11, and repeated description will be omitted.

The discharge plate 601 may include a plurality of outlet holes 631 formed at the first area 630. The first area 630 may be disposed at a center area of the discharge plate 601.

The plurality of outlet holes 631 may be spirally disposed outward from a center portion of the first area 630. The plurality of outlet holes 631 may be arranged so that a first distance d1 between a first outlet hole h1 randomly selected from the plurality of outlet holes 631 and a second outlet hole h2 outwardly adjacent to the first outlet hole h1 on a spiral line has a distance increased by a certain proportion from a second distance d2 between the first outlet hole h1 and a third outlet hole h3 inwardly adjacent to the first outlet hole h1 on the spiral line. According to one example, the first distance d1 may be in a proportion increased from the second distance d2 by 10%. Alternatively, an increased proportion of the first distance d1 may be different from that of the second distance d2.

Also, the plurality of outlet holes 631 may be formed on straight lines a1 to a12 arranged at the center portion of the first area 630 to be spaced apart from each other at a first angle θ1. The plurality of outlet holes 631 may be arranged to be sequentially rotated at the first angle θ1 on the spiral line based on the center portion of the first area 630. According to one example, the first angle θ1 may be 30°. Alternatively, the first angle θ1 may be 30° or more or 30° or less.

FIG. 15 is a view illustrating a second modified example of the discharge plate of FIG. 11.

Referring to FIG. 15, a discharge plate 602 is different from the discharge plate 600 of FIG. 11 in that an outlet hole 641 formed at a first area 640 is disposed in a different shape therefrom, and other configurations are the same as those thereof. Hereinafter, description will be provided centering on a difference from the discharge plate 600 of FIG. 11, and repeated description will be omitted.

A plurality of outlet holes 641 may be formed on a plurality of concentric circles b1 to b6 formed at the first area 640 to be spaced apart from each other at a first distance d1. According to one example, one outlet hole 641 may be formed on a first concentric circle b1 close to a center portion of the first area 640), and three outlet holes 641 may be formed on a second concentric circle b2, and five outlet holes 641 may be formed on a third concentric circle b3. As described above, the adjacent concentric circles may be arranged so that the number of outlet holes 641 formed thereon is constantly increased.

FIG. 16 is a view illustrating a first modified example of the flange of FIG. 13.

Referring to FIG. 16, a flange 665 is different from the flange 625 of FIG. 13 in a shape of the flange 665, and other configurations are the same as those thereof. Hereinafter, description will be provided centering on a difference from the flange 625 of FIG. 13, and repeated description will be omitted.

The discharge plate 600 may include a plurality of outlet holes 661. Each of the plurality of outlet holes 661 may include the flange 665. The flange 665 may be provided in a shape protruding from a lower surface 669a of a flange groove 669 to the outside of the cooking chamber 20.

The flange 665 may be provided to form a first angle α1 from the lower surface 669a of the flange groove 669. The first angle α1 may be an obtuse angle. In this case, the flange 665 may be provided so that a cross section of the outlet hole 661 becomes narrower toward the outside of the cooking chamber 20.

FIG. 17 is a view illustrating a second modified example of the flange of FIG. 13.

Referring to FIG. 17, a flange 675 is different from the flange 625 of FIG. 13 in a shape of the flange 675, and other configurations are the same as those thereof. Hereinafter, description will be provided centering on a difference from the flange 625 of FIG. 13, and repeated description will be omitted.

The discharge plate 600 may include a plurality of outlet holes 671. Each of the plurality of outlet holes 671 may include the flange 675. The flange 675 may be provided in a shape protruding from a lower surface 679a of a flange groove 679 to the outside of the cooking chamber 20.

The flange 675 may be provided to form a second angle α2 from the lower surface 679a of the flange groove 679. The second angle α2 may be an acute angle. In this case, the flange 675 may be provided so that a cross section of the outlet hole 671 becomes wider toward the outside of the cooking chamber 20.

Hereinafter, a process in which the food is cooked through the hot air discharging unit 100 in the cooking apparatus 1 according to one embodiment of the present invention will be described.

FIGS. 18 and 19 are views illustrating an air flow in the cooking chamber and the hot air discharging unit of the cooking apparatus according to one embodiment of the present invention.

Referring to FIGS. 18 and 19, the air in the cooking chamber 20 may be introduced into the duct member 110 through the inlet part 25. The air in the cooking chamber 20 may be introduced into the duct member 110 through the inlet part 25 by a suction force generated from the centrifugal fan 120 disposed inside the duct member 110.

The air introduced to an inside of the centrifugal fan 120 through the inlet part 25 may be blown radially from a center axis of the centrifugal fan 120 due to rotation of the centrifugal fan 120. Therefore, some of the air may be moved to the first outlet part 26 along the duct member 110. Also, the remaining part of the air may be moved to the second outlet part 27 along the duct member 110.

The air discharged from the centrifugal fan 120 passes through the heater 130. The air may be heated to a temperature for cooking food while passing through the heater 130. Therefore, the heated air may be moved to the first outlet part 26 and the second outlet part 27 through the duct member 110.

The air moved toward the first outlet part 26 may be discharged from the first outlet part 26 into the cooking chamber 20 due to a pressure of the duct member 110. The air discharged through the first outlet part 26 may directly or indirectly transfer heat to the food put on the tray 81.

According to one example, the food may be cooked while the air discharged through the first outlet part 26 directly collides with the food. In this case, the cooking time may be shortened more than an existing case in which the food is cooked by convection heat. Also, since the first outlet part 26 is formed at a position of the second plate 23 facing the food, the air discharged through the first outlet part 26 may be provided to evenly cook the entire food.

The controller 150 may control a rotating speed of the centrifugal fan 120 and thus may control whether the air discharged through the first outlet part 26 directly collides with the food. The rotating speed of the centrifugal fan 120 may be controlled according to the cooking mode of the cooking apparatus 1, and thus the colliding speed of the air discharged through the first outlet part 26 with the food may be controlled.

Specifically, in the cooking apparatus 1 according to one embodiment of the present invention, when the colliding speed of the air discharged through the first outlet part 26 with the food is 1 m/s or less, the food may be cooked in the same method as that in an existing convection device in which the food is cooked using the convection heat. Otherwise, in the cooking apparatus 1, when the colliding speed of the air discharged through the first outlet part 26 with the food is 2 to 3 m/s, the heated air may directly exchange heat with the food, and thus the cooking time may be shortened. Accordingly, the user may select the cooking mode of the cooking apparatus 1.

The air moved toward the second outlet part 27 may be discharged from the second outlet part 27 into the cooking chamber 20 due to the pressure of the duct member 110. The air may be discharged from the side surface of the cooking chamber 20 toward the food through the second outlet part 27. The high-temperature air may be discharged to a lower portion of the cooking chamber 20 through the second outlet part 27. The air discharged through the second outlet part 27 may be provided together with the air discharged through the first outlet part 26 to allow the food to be cooked.

Also, the air discharged from the first outlet part 26 may be reheated while passing through the grill heater 70. Therefore, since the cooking may be performed while the high-temperature air comes in contact with the food, cooking performance may be enhanced. Also, since the food may be cooked using the radiant heat generated from the grill heater 70 while the high-temperature air collides with the food to cook the food, the cooking performance may be enhanced.

According to one embodiment of the present invention, the cooking apparatus 1 may be configured so that the hot air discharging unit 100 allows the high-temperature air to collide with the food at a speed of 2 to 3 m/s. Also, the cooking apparatus 1 may be configured so that the hot air discharging unit 100 allows the high-temperature air to evenly collide with the entire food.

Due to such a configuration, the cooking apparatus 1 may shorten the cooking time of the food. Also, the cooking apparatus 1 may have various cooking modes for cooking food. Also, the cooking apparatus 1 may change the cooking mode by controlling the hot air discharging unit 100 to control the colliding speed of the high-temperature air with the food. Specifically, the hot air discharging unit 100 may control the high-temperature air to be in contact with the food at a speed of 1 m/s or less and thus may allow heat to be transferred by the convection. Due to such a configuration, the food may be more evenly cooked even in a general convection mode.

Also, the cooking apparatus 1 according to one embodiment of the present invention may allow the high-temperature air to directly collide with the food using one hot air discharging unit 100 and thus may cook the food by the heat exchange, or may cook the food by the heat exchange with the food due to the convection of the high-temperature air. Accordingly, the user may select an effective cooking mode according to a kind of the food.

Hereinafter, a modified example of the present invention will be described.

FIG. 20 is a view illustrating a configuration of a hot air discharging unit according to a first modified example of the present invention.

Referring to FIG. 20, a hot air discharging unit 200 may include a duct member 210, a fan 220, a heater 230 and a motor 240. The hot air discharging unit 200 is provided so that installation positions of a first duct 211 and an inlet part (not shown) are different from those in the hot air discharging unit 100 of FIG. 5, and other configurations are the same as those of the hot air discharging unit 100 of FIG. 5. Hereinafter, description will be provided centering on a difference from the hot air discharging unit 100 of FIG. 5, and repeated description will be omitted.

The duct member 210 may include the first duct 211 and a second duct 212. The first duct 211 may be installed at an outer surface of a rear plate 24 provided at a rear side of the cooking chamber 20. Therefore, the inlet part provided to allow the air in the cooking chamber 20 to be introduced into the first duct 211 may also be formed at the rear plate 24. The inlet part may be formed at a position of the rear plate 24 facing the fan 220.

The first duct 211 may be provided in a shape extending upward from the rear side of the cooking chamber 20. The first duct 211 may be configured to be connected to a second duct. Therefore, the duct member 210 may guide the air therein to be moved from the inlet part to an outlet part 26.

The motor 240 may be disposed at a position of an upper portion of the second duct 212 which may be connected to a second pulley 225 provided at the fan 220 inside the first duct 211 according to a position of the first duct 211. Therefore, the motor 240 may be disposed at one side of a rear of the upper portion of the second duct 212.

The second outlet part 27 installed at the first plate 21 of FIG. 5 may not be provided at the rear plate 24. Therefore, the hot air discharging unit 200 according to the first modified example of the present invention may be provided so that the inlet part and the outlet part are formed at separate plates of a plurality of plates forming the cooking chamber 20.

FIG. 21 is a view illustrating an air flow in the hot air discharging unit and the cooking chamber of FIG. 20.

Referring to FIGS. 20 and 21, the air in the cooking chamber 20 is introduced into the first duct 211 through the rear plate 24. The fan 220 may blow the air in the first duct 211, and the air discharged from the fan 220 may be heated while passing through the heater 230.

The heated air is discharged toward the food through the outlet part 26. The outlet part 26 is provided at the second plate 23, and the air discharged through the outlet part 26 may be vertically moved down toward the food and may collide with the food, and thus the food may be cooked.

FIG. 22 is a view illustrating a configuration of a hot air discharging unit according to a second modified example of the present invention.

Referring to FIG. 22, a hot air discharging unit 300 may include duct members 311, 312 and 313, fans 321 and 322, heaters 331 and 332 and motors 341 and 342. The hot air discharging unit 300 further includes a second duct 312, a second fan 322, a second heater 332 and a second motor 342 when comparing with the hot air discharging unit 100 of FIG. 5, and the remaining configurations are the same as those of the hot air discharging unit 100 of FIG. 5. Hereinafter, description will be provided centering on a difference from the hot air discharging unit 100 of FIG. 5, and repeated description will be omitted.

The second duct 312, the second fan 322, the second heater 332 and the second motor 342 may be formed at a second plate 22 facing a first plate 21 at which a first duct 311, a first fan 321, a first heater 331 and the second motor 341 are installed.

The second duct 312, the second fan 322, the second heater 332 and the second motor 342 may be disposed at positions symmetrical with the first duct 311, the first fan 321, the first heater 331 and the second motor 341 based on the cooking chamber 20.

FIG. 23 is a view illustrating an air flow in the hot air discharging unit and the cooking chamber of FIG. 22.

Referring to FIGS. 22 and 23, the air in the cooking chamber 20 may be introduced into each of the first duct 311 and the second duct 312 through the first plate 21 and the second plate 22. The first fan 321 and the second fan 322 may be respectively moved from the first duct 311 and the second duct 312 to a third duct 213 installed at an outer surface of the second plate 23. The high-temperature air moved to the third duct 213 may be discharged toward the food through the outlet part 26. While the air discharged to the food exchanges heat with the food, the food may be cooked.

The hot air discharging unit 300 may introduce the air in the cooking chamber 20 to each of the first duct 311 and the second duct 312 through the first plate 21 and the second plate 22. The air heated in the first duct 311 and the second duct 312 may be moved to the third duct and may be discharged through the outlet part 26, and thus the food may be cooked.

FIG. 24 is a view illustrating a configuration of a hot air discharging unit according to a third modified example of the present invention.

Referring to FIG. 24, a hot air discharging unit 400 may include duct members 411, 412, 413 and 414, fans 421 and 422, heaters 431 and 432 and motors 441 and 442. The hot air discharging unit 30X) further includes a second duct 412, a fourth duct 415, a second fan 422, a second heater 432 and a second motor 442 when comparing with the hot air discharging unit 100 of FIG. 5, and the remaining configurations are the same as those of the hot air discharging unit 100 of FIG. 5. Hereinafter, description will be provided centering on a difference from the hot air discharging unit 100 of FIG. 5, and repeated description will be omitted.

The second duct 412, the second fan 422, the second heater 432 and the second motor 442 may be formed at a second plate 22 facing a first plate 21 at which a first duct 411, a first fan 421, a first heater 431 and the second motor 441 are installed.

The second duct 412, the second fan 422, the second heater 432 and the second motor 442 may be disposed at positions symmetrical with the first duct 411, the first fan 421, the first heater 431 and the second motor 441 based on the cooking chamber 20.

The fourth duct 415 may be installed at an outer surface of a lower plate of the cooking chamber 20. A second outlet part 29 may be formed at the lower plate of the cooking chamber 20. The second outlet part 29 may be configured so that the fourth duct 415 and an inside of the cooking chamber 20 are in communication with each other.

The fourth duct 415 may be connected to each of the first duct 411 and the second duct 412. Therefore, the air heated in the first duct 411 and the second duct 412 may be moved to the fourth duct 415.

FIG. 25 is a view illustrating an air flow in the hot air discharging unit and the cooking chamber of FIG. 24.

Referring to FIGS. 24 and 25, the air in the cooking chamber 20 may be introduced into each of the first duct 411 and the second duct 412 through the first plate 21 and the second plate 22. The first fan 421 and the second fan 422 may be respectively moved from the first duct 411 and the second duct 412 to the third duct 413 installed at an outer surface of the second plate 23. The high-temperature air moved to the third duct 413 may be discharged toward the food through the first outlet part 26. While the air discharged to the food exchanges heat with the food, the food may be cooked.

Also, the air heated in the first duct 411 and the second duct 412 may be moved to the fourth duct 415 installed at the outer surface of the lower plate by the first fan 421 and the second fan 422, respectively. The air in the fourth duct 415 may be supplied to a lower side of the food through the second outlet part 29. The high-temperature air supplied through the second outlet part 29 may evenly cook an upper surface and a lower surface of the food together with the air discharged through the first outlet part 26.

Although a few embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. A cooking apparatus comprising:
a casing;
a cooking chamber provided inside the casing;
a hot air discharging unit configured to discharge high-temperature air; and
a discharge plate provided as an upper plate and having
a first surface forming an interior surface of the cooking chamber, and a second surface opposite to the first surface and thereby being outside of the cooking chamber,
a plurality of outlet holes formed in the discharge plate between the first surface and the second surface through which the air discharged by the hot air discharging unit passes to enter the cooking chamber,
a plurality of flanges formed by the discharge plate and corresponding, respectively, to the plurality of outlet holes, each flange of the plurality of flanges extending from the second surface of the discharge plate outside of the cooking chamber, along a periphery of the corresponding outlet hole and protruding from the discharge plate in a direction which is opposite to a direction in which the air discharged by the hot air discharging unit passes through the plurality of outlet holes, and
a plurality of flange grooves corresponding, respectively, to the plurality of flanges, formed by the discharge plate in the second surface of the discharge plate and which are thereby outside of the cooking chamber, wherein
each flange of the plurality of flanges is surrounded by, and extends from a lower surface of, the corresponding flange groove of the plurality of flange grooves, so that the flange and the flange groove cooperate together to guide the air discharged by the hot air discharging unit to enter the flange in a direction perpendicular to the discharge plate, and to then pass through the outlet hole corresponding to the flange in the direction perpendicular to the discharge plate, and
one end of each flange of the plurality of flanges is located between the second surface of the discharge plate and the lower surface of the corresponding flange groove of the plurality of flange grooves.

2. The cooking apparatus of claim 1, wherein the plurality of outlet holes are spirally disposed in the discharge plate, and the plurality of outlet holes are arranged so that a first distance between a first outlet hole of the plurality of outlet holes and a second outlet hole outwardly adjacent to the first outlet hole on a spiral line has a distance increased by a certain proportion from a second distance between the first outlet hole and a third outlet hole inwardly adjacent to the first outlet hole on the spiral line.

3. The cooking apparatus of claim 2, wherein the plurality of outlet holes are arranged to be sequentially rotated at a first angle on the spiral line.

4. The cooking apparatus of claim 1, wherein the direction in which each flange of the plurality of flanges protrudes is vertical to the discharge plate.

5. A cooking apparatus comprising:
   a casing;
   a cooking chamber provided inside the casing;
   a hot air discharging unit configured to discharge high-temperature air; and
   a discharge plate provided as an upper plate and having
      a first surface forming an interior surface of the cooking chamber, and a second surface opposite to the first surface and thereby being outside of the cooking chamber,
      a plurality of outlet holes formed in the discharge plate between the first surface and the second surface through which the air discharged by the hot air discharging unit passes to enter the cooking chamber, and
      a plurality of flanges formed by the discharge plate and corresponding, respectively, to the plurality of outlet holes, each flange of the plurality of flanges extending from the second surface of the discharge plate outside of the cooking chamber, along a periphery of the corresponding outlet hole and protruding from the discharge plate in a direction which is opposite to a direction in which the air discharged by the hot air discharging unit passes through the plurality of outlet holes,
      a plurality of flange grooves corresponding, respectively, to the plurality of flanges, formed by the discharge plate in the second surface of the discharge plate and which are thereby outside of the cooking chamber, wherein
      each flange of the plurality of flanges is surrounded by, and extends from a lower surface of, the corresponding flange groove of the plurality of flange grooves, so that the flange and the flange groove cooperate together to guide the air discharged by the hot air discharging unit to enter the flange in a direction perpendicular to the discharge plate, and to then pass through the outlet hole corresponding to the flange in the direction perpendicular to the discharge plate,
      the plurality of outlet holes are formed along concentric circles from a center of the discharge plate, and concentric circles that are farther from the center have more outlet holes than concentric circles that are closer to the center, and
      one end of each flange of the plurality of flanges is located between the second surface of the discharge plate and the lower surface of the corresponding flange groove of the plurality of flange grooves.

* * * * *